United States Patent
Ogata et al.

(10) Patent No.: US 10,388,050 B2
(45) Date of Patent: Aug. 20, 2019

(54) SYSTEM AND METHOD FOR CREATING CUSTOMIZED CLOTHING THAT COMBINES CLOTHING SHAPES, CLOTHING PATTERNS, DOLLS AND THE USER'S HEAD IMAGE

(71) Applicant: SEIREN CO., LTD., Fukui (JP)

(72) Inventors: Norihiro Ogata, Fukui (JP); Junichi Hashimoto, Fukui (JP); Toshiro Kawabata, Fukui (JP); Kozo Nagata, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 15/562,332

(22) PCT Filed: Mar. 29, 2016

(86) PCT No.: PCT/JP2016/060009
§ 371 (c)(1),
(2) Date: Sep. 27, 2017

(87) PCT Pub. No.: WO2016/158896
PCT Pub. Date: Oct. 6, 2016

(65) Prior Publication Data
US 2018/0350117 A1 Dec. 6, 2018

(30) Foreign Application Priority Data
Mar. 31, 2015 (JP) .................................. 2015-074137

(51) Int. Cl.
*G06T 11/60* (2006.01)
*G06F 17/50* (2006.01)
(Continued)

(52) U.S. Cl.
CPC .............. *G06T 11/60* (2013.01); *G06F 17/50* (2013.01); *G06Q 50/10* (2013.01); *G06T 11/001* (2013.01);
(Continued)

(58) Field of Classification Search
None
See application file for complete search history.

(56) References Cited

U.S. PATENT DOCUMENTS

| 4,149,246 A | 4/1979 | Goldman |
| 5,615,318 A | 3/1997 | Matsuura |

(Continued)

FOREIGN PATENT DOCUMENTS

| EP | 1160733 A1 | 12/2001 |
| JP | 10-340282 | 12/1998 |

(Continued)

OTHER PUBLICATIONS

International Search Report dated Jun. 28, 2016 filed in PCT/JP2016/060009.
(Continued)

*Primary Examiner* — Xiao M Wu
*Assistant Examiner* — Steven Z Elbinger
(74) *Attorney, Agent, or Firm* — Rankin, Hill & Clark LLP

(57) ABSTRACT

First or second clothing information corresponding to a first or second shape is obtained, and first or second pattern information corresponding to a first or second pattern is obtained. First or second clothing data corresponding to clothes with the first or second shape associated with the first or second clothing information is combined with first or second pattern data corresponding to the first or second pattern associated with the first or second pattern information to create composite data corresponding to a composite
(Continued)

image of clothes with the first or second pattern and the first or second shape. The composite image corresponding to the composite data is output to and displayed in a display device.

13 Claims, 19 Drawing Sheets

(51) Int. Cl.
　　　*G06Q 50/10* 　　　　(2012.01)
　　　*G06T 19/20* 　　　　(2011.01)
　　　*G06T 11/00* 　　　　(2006.01)
　　　*G06Q 30/06* 　　　　(2012.01)
(52) U.S. Cl.
　　　CPC ......... *G06T 19/20* (2013.01); *G06Q 30/0621* (2013.01); *G06T 2210/16* (2013.01)

(56) References Cited

U.S. PATENT DOCUMENTS

| | | | |
|---|---|---|---|
| 8,249,738 B2 * | 8/2012 | Lastra | A41H 3/007 700/132 |
| 2010/0174400 A1 * | 7/2010 | Lai | A41H 3/007 700/132 |
| 2012/0086783 A1 * | 4/2012 | Sareen | G06N 3/006 348/47 |
| 2012/0109777 A1 * | 5/2012 | Lipsitz | G06Q 30/06 705/26.5 |
| 2014/0279289 A1 * | 9/2014 | Steermann | G06Q 30/0643 705/27.2 |
| 2015/0279098 A1 * | 10/2015 | Kim | G06T 17/20 345/420 |
| 2016/0042542 A1 * | 2/2016 | Osada | G06T 11/60 345/632 |

FOREIGN PATENT DOCUMENTS

| | | | | |
|---|---|---|---|---|
| JP | 11-001814 | | 1/1999 | |
| JP | 2000-187683 | | 7/2000 | |
| WO | WO-2014081394 A1 * | 5/2014 | | G06T 19/20 |

OTHER PUBLICATIONS

Extended European Search Report dated Nov. 6, 2018 for EP patent application No. 16772777.5.

* cited by examiner

FIG. 20
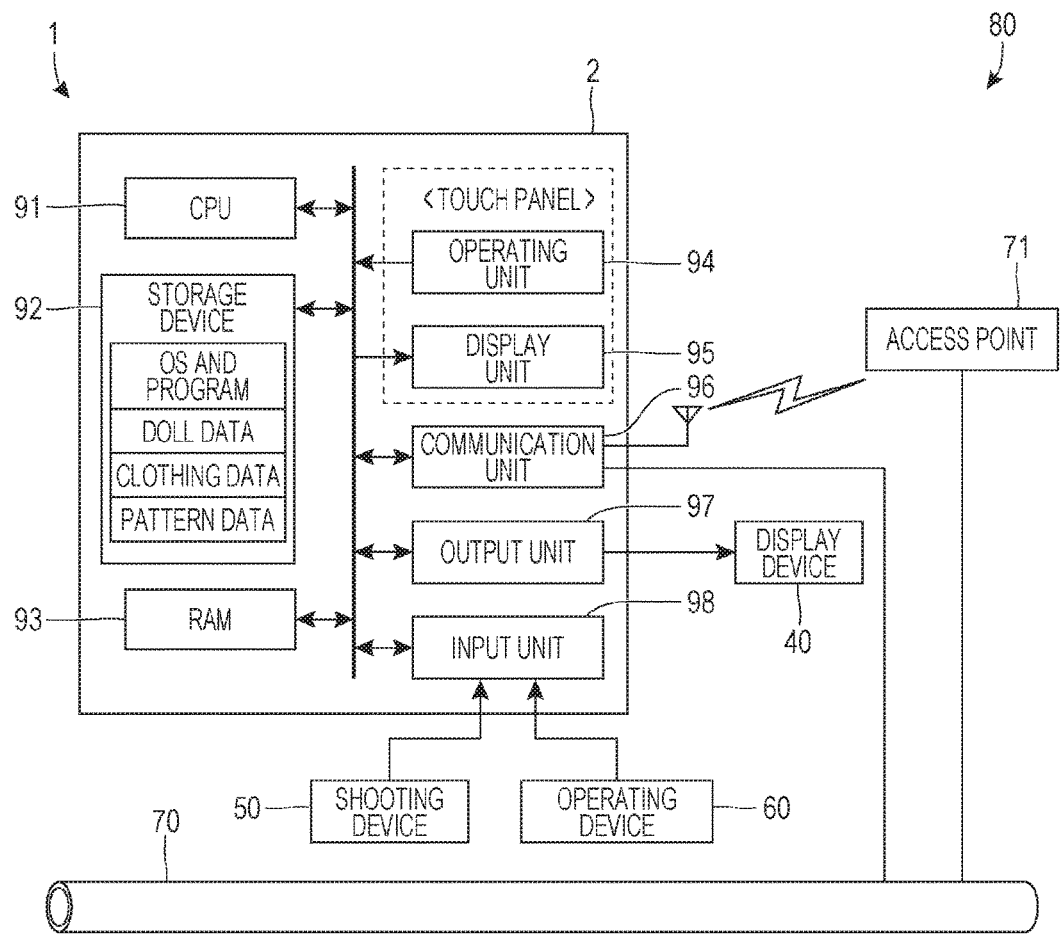
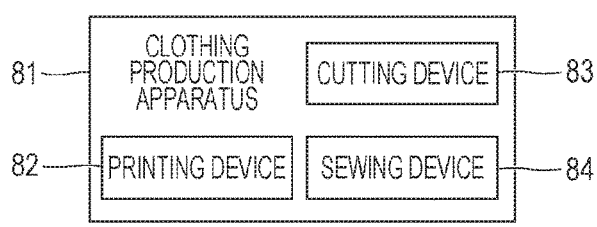

SYSTEM AND METHOD FOR CREATING CUSTOMIZED CLOTHING THAT COMBINES CLOTHING SHAPES, CLOTHING PATTERNS, DOLLS AND THE USER'S HEAD IMAGE

TECHNICAL FIELD

The present invention relates to a clothing design display system that displays a composite image of clothes, a clothing production system that produces the clothes, a clothing design output system that outputs the composite image of the clothes to a display device, and a clothing design output method.

BACKGROUND ART

A technique to confirm an impression of clothes after completion in advance when the clothes are manufactured has been proposed. For example, Patent Literature 1 discloses a production method for garments and accessories. The production method includes a selection step of a cloth and a design. In the selection step of the cloth and the design, a shop assistant or a customer himself/herself executes work using an apparatus installed in a retailer to display a selection and a clothed image. Customer's favorite design and cloth are selected and determined. Color and pattern settings are executed to the selected design using a three-dimensional design component. The finished image is displayed through computer graphics.

CITATION LIST

Patent Literature

Patent Literature 1: JP-A-2000-187683

SUMMARY OF THE INVENTION

Problems to be Solved by the Invention

There is a sales form to customize and sell clothes designed to meet the demands from a customer. The inventors considered that, a system, with which an impression felt from clothes in an actually completed state can be confirmed before manufacturing the clothes, is effective to such sales form, if a coloring of the clothes after completion differs from the coloring that has impressed the customer, the feeling of satisfaction cannot be provided to the customer. The inventors have studied a technique to express, in the design phase, the impression felt from the clothes in the actually completed state. Then, the inventors have also studied a technique that allows for smooth designing, in the design phase, of clothes meeting the demands from the customer.

An object of the present invention is to provide a clothing design display system, a clothing production system, a clothing design output system, and a clothing design output method. The systems and the method of the present invention allow a display device to display, in the design phase, a composite image with an impression close to an impression felt from custom-made clothes after completion.

Solution to the Problems

An aspect of the present invention is a clothing design display system including a terminal, an image processing device, and a display device, wherein: the terminal includes a first controller and a first communication unit, the first controller being configured to obtain any of first clothing information and second clothing information as clothing information corresponding to a shape of clothes, the first clothing information corresponding to a first shape, the second clothing information corresponding to a second shape different from the first shape, the first controller being configured to obtain any of first pattern information and second pattern information as pattern information corresponding to a pattern of clothes, the first pattern information corresponding to a first pattern, the second pattern information corresponding to a second pattern different from the first pattern, the first communication unit being configured to transmit the clothing information and the pattern information obtained by the first controller to the image processing device; the image processing device includes a second communication unit, a storage unit, a second controller, and an output unit, the second communication unit being configured to receive the clothing information and the pattern information transmitted from the terminal, the storage unit storing first clothing data and second clothing data, the first clothing data corresponding to clothes with the first shape associated with the first clothing information, the second clothing data corresponding to clothes with the second shape associated with the second clothing information, the storage unit storing first pattern data and second pattern data, the first pattern data corresponding to the first pattern associated with the first pattern information, the second pattern data corresponding to the second pattern associated with the second pattern information, the second controller being configured such that: when the clothing information and the pattern information received by the second communication unit are the first clothing information and the first pattern information, the second controller combines the first clothing data and the first pattern data to create composite data corresponding to a composite image of clothes with the first pattern and the first shape; when the clothing information and the pattern information received by the second communication unit are the first clothing information and the second pattern information, the second controller combines the first clothing data and the second pattern data to create composite data corresponding to a composite image of clothes with the second pattern and the first shape; when the clothing information and the pattern information received by the second communication unit are the second clothing information and the first pattern information, the second controller combines the second clothing data and the first pattern data to create composite data corresponding to a composite image of clothes with the first pattern and the second shape; and when the clothing information and the pattern information received by the second communication unit are the second clothing information and the second pattern information, the second controller combines the second clothing data and the second pattern data to create composite data corresponding to a composite image of clothes with the second pattern and the second shape, the output unit being configured to output the composite image corresponding to the composite data created by the second controller to the display device; and the display device is configured to display the composite image output from the image processing device.

This clothing design display system allows the display device to display the composite image of clothes with a predetermined pattern and a predetermined shape according to the clothing information and the pattern information obtained by the terminal. Making the display device large allows for displaying the clothes with the predetermined pattern and the predetermined shape in a large scale. By displaying the clothes with the predetermined pattern and the predetermined shape in a large scale, the sizes of the clothes in the composite image and of the actual clothes have close values, and failures caused by the difference in the perceived colors due to the area effect are solved beforehand.

The clothing design display system may be configured as follows: the first controller is configured to obtain any of first figure information and second figure information as figure information corresponding to a figure of a human, the first figure information corresponding to a first figure, the second figure information corresponding to a second figure different from the first figure, the first communication unit is configured to transmit the clothing information, the pattern information, and the figure information obtained by the first controller to the image processing device, the second communication unit is configured to receive the clothing information, the pattern information, and the figure information transmitted from the terminal, the storage unit stores first doll data and second doll data, the first doll data corresponding to a doll with the first figure associated with the first figure information, the second doll data corresponding to a doll with the second figure associated with the second figure information, and the second controller is configured such that: when the clothing information, the pattern information, and the figure information received by the second communication unit are the first clothing information, the first pattern information, and the first figure information, the second controller combines the first clothing data, the first pattern data, and the first doll data to create composite data corresponding to a composite image of a doll with the first figure who wears the clothes with the first pattern and the first shape; when the clothing information, the pattern information, and the figure information received by the second communication unit are the first clothing information, the first pattern information, and the second figure information, the second controller combines the first clothing data, the first pattern data, and the second doll data to create composite data corresponding to a composite image of a doll with the second figure who wears the clothes with the first pattern and the first shape; when the clothing information, the pattern information, and the figure information received by the second communication unit are the first clothing information, the second pattern information, and the first figure information, the second controller combines the first clothing data, the second pattern data, and the first doll data to create composite data corresponding to a composite image of a doll with the first figure who wears the clothes with the second pattern and the first shape; when the clothing information, the pattern information, and the figure information received by the second communication unit are the first clothing information, the second pattern information, and the second figure information, the second controller combines the first clothing data, the second pattern data, and the second doll data to create composite data corresponding to a composite image of a doll with the second figure who wears the clothes with the second pattern and the first shape; when the clothing information, the pattern information, and the figure information received by the second communication unit are the second clothing information, the first pattern information, and the first figure information, the second controller combines the second clothing data, the first pattern data, and the first doll data to create composite data corresponding to a composite image of a doll with the first figure who wears the clothes with the first pattern and the second shape; when the clothing information, the pattern information, and the figure information received by the second communication unit the second clothing information, the first pattern information, and the second figure information, the second controller combines the second clothing data, the first pattern data, and the second doll data to create composite data corresponding to a composite image of a doll with the second figure who wears the clothes with the first pattern and the second shape; when the clothing information, the pattern information, and the figure information received by the second communication unit are the second clothing information, the second pattern information, and the first figure information, the second controller combines the second clothing data, the second pattern data, and the first doll data to create composite data corresponding to a composite image of a doll with the first figure who wears the clothes with the second pattern and the second shape; and when the clothing information, the pattern information, and the figure information received by the second communication unit are the second clothing information, the second pattern information, and the second figure information, the second controller combines the second clothing data, the second pattern data, and the second doll data to create composite data corresponding to a composite image of a doll with the second figure who wears the clothes with the second pattern and the second shape.

This configuration allows the display device to display the composite image of the doll with a predetermined figure who wears the clothes with the predetermined pattern and the predetermined shape according to the clothing information, the pattern information, and the figure information obtained by the terminal. Since the composite image is in the state in which the doll with the predetermined figure wears the clothes with the predetermined pattern and the predetermined shape, a user can recognize an impression of newly-designed clothes. For example, suppose that the newly-designed clothes are sleeveless or short-sleeved. Suppose that clothes that the user actually wears are long-sleeved clothes. As the composite data, created may also be composite data corresponding to a composite image in a state in which a full length of the user, who wears the long-sleeved clothes, has been shot, and further the user wears the previously mentioned sleeveless or short-sleeved clothes. Note that it is sometimes difficult with the composite image in such state to accurately recognize the impression of the newly-designed clothes due to an influence from the long-sleeved part and a pattern of the part of the clothes that the user actually wears. When the impression of the newly-designed clothes is recognized, the influence from the clothes that the user actually wears can be restrained.

The clothing design display system may be configured as follows: the second controller is configured to obtain shot data corresponding to a shot image including a head of the human shot by a shooting device, the second controller is configured to extract head data corresponding to a head image of the head of the human from the shot data obtained by the second controller, and the second controller is configured such that: when the clothing information, the pattern information, and the figure information received by the second communication unit are the first clothing information, the first pattern information, and the first figure information, the second controller combines the first clothing data, the first pattern data, the first doll data, and the head data that is extracted by the second controller to create composite data corresponding to a composite image of a doll with the first figure and further having a head set as the head image corresponding to the head data who wears the clothes with the first pattern and the first shape; when the clothing information, the pattern information, and the figure information received by the second communication unit are the first clothing information, the first pattern information, and the second figure information, the second controller combines the first clothing data, the first pattern data, the second doll data, and the head data that is extracted by the second controller to create composite data corresponding to a composite image of a doll with the second figure and further having a head set as the head image corresponding to the head data who wears the clothes with the first pattern and the first shape; when the clothing information, the pattern information, and the figure information received by the second communication unit are the first clothing information, the second pattern information, and the first figure information, the second controller combines the first clothing data, the second pattern data, the first doll data, and the head data that is extracted by the second controller to create composite data corresponding to a composite image of a doll with the first figure and further having a head set as the head image corresponding to the head data who wears the clothes with the second pattern and the first shape; when the clothing information, the pattern information, and the figure information received by the second communication unit are the first clothing information, the second pattern information, and the second figure information, the second controller combines the first clothing data, the second pattern data, the second doll data, and the head data that is extracted by the second controller to create composite data corresponding to a composite image of a doll with the second figure and further having a head set as the head image corresponding to the head data who wears the clothes with the second pattern and the first shape; when the clothing information, the pattern information, and the figure information received by the second communication unit are the second clothing information, the first pattern information, and the first figure information, the second controller combines the second clothing data, the first pattern data, the first doll data, and the head data that is extracted by the second controller to create composite data corresponding to a composite image of a doll with the first figure and further having a head set as the head image corresponding to the head data who wears the clothes with the first pattern and the second shape; when the clothing information, the pattern information, and the figure information received by the second communication unit are the second clothing information, the first pattern information, and the second figure information, the second controller combines the second clothing data, the first pattern data, the second doll data, and the head data that is extracted by the second controller to create composite data corresponding to a composite image of a doll with the second figure and further having a head set as the head image corresponding to the head data who wears the clothes with the first pattern and the second shape; when the clothing information, the pattern information, and the figure information received by the second communication unit are the second clothing information, the second pattern information, and the first figure information, the second controller combines the second clothing data, the second pattern data, the first doll data, and the head data that is extracted by the second controller to create composite data corresponding to a composite image of a doll with the first figure and further having a head set as the head image corresponding to the head data who wears the clothes with the second pattern and the second shape; and when the clothing information, the pattern information, and the figure information received by the second communication unit are the second clothing information, the second pattern information, and the second figure information, the second controller combines the second clothing data, the second pattern data, the second doll data, and the head data that is extracted by the second controller to create composite data corresponding to a composite image of a doll with the second figure and further having a head set as the head image corresponding to the head data who wears the clothes with the second pattern and the second shape. In this case, the clothing design display system may be configured as follows: the second controller is configured to specify color information of a skin of the human included in the head image from the head data extracted by the second controller, and the second controller is configured to create the composite data corresponding to the composite image of a doll, the doll having a head set as the head image corresponding to the head data, a part of the doll excluding the head not covered with worn clothes being set as a color corresponding to the color information specified by the second controller.

This configuration allows the user to recognize the impression of an appearance of himself/herself who actually wears the newly-designed clothes.

The clothing design display system may be configured as follows: the second controller is configured to create first composite data and second composite data as the composite data corresponding to the composite image, the first composite data corresponding to a first composite image of a doll having a head not set as the head image corresponding to the head data, the second composite data corresponding to a second composite image of a doll having a head set as the head image corresponding to the head data, the output unit is configured to output the second composite image corresponding to the second composite data created by the second controller to the display device, the second communication unit is configured to transmit the first composite data created by the second controller to the terminal, the first communication unit is configured to receive the first composite data transmitted from the image processing device, and the terminal includes a display unit configured to display the first composite image, the first composite image corresponding to the first composite data received by the first communication unit.

This configuration allows the display unit on the terminal to display the first composite image and the display device to display the second composite image. The first composite image that does not include the head of the user displayed in the display unit on the terminal allows the user to recognize the impression of the clothes themselves. The second composite image displayed in the display device allows the user to recognize the impression of an appearance of himself/herself who actually wears the newly-designed clothes.

The clothing design display system may be configured as follows: the second communication unit is configured to transmit the composite data created by the second controller to the terminal, the first communication unit is configured to receive the composite data transmitted from the image processing device, and the terminal includes a display unit configured to display the composite image corresponding to the composite data received by the first communication unit. This allows the display device and the display unit on the terminal to display the composite images.

Another aspect of the present invention is a clothing production system including any one of the above-mentioned clothing design display systems and a clothing production apparatus configured to produce clothes. The clothing production apparatus is configured to produce clothes in the composite image corresponding to the composite data created by the second controller. This clothing production system allows for producing newly-designed clothes with the clothing design display system. The clothes meeting the demands from the user can be provided to this user.

Still another aspect of the present invention is a clothing design output system including: a controller configured to obtain any of first clothing information and second clothing information as clothing information corresponding to a shape of clothes, the first clothing information corresponding to a first shape, the second clothing information corresponding to a second shape different from the first shape, wherein the controller obtains any of first pattern information and second pattern information as pattern information corresponding to a pattern of clothes, the first pattern information corresponding to a first pattern, the second pattern information corresponding to a second pattern different from the first pattern; a storage unit configured to store first clothing data and second clothing data, the first clothing data corresponding to clothes with the first shape associated with the first clothing information, the second clothing data corresponding to clothes with the second shape associated with the second clothing information, wherein the storage unit stores first pattern data and second pattern data, the first pattern data corresponding to the first pattern associated with the first pattern information, the second pattern data corresponding to the second pattern associated with the second pattern information; and an output unit configured to output a composite image corresponding to composite data to a display device configured to display the composite image, wherein the controller is configured such that: when the clothing information and the pattern information obtained by the controller are the first clothing information and the first pattern information, the controller combines the first clothing data and the first pattern data to create composite data corresponding to a composite image of clothes with the first pattern and the first shape; when the clothing information and the pattern information obtained by the controller are the first clothing information and the second pattern information, the controller combines the first clothing data and the second pattern data to create composite data corresponding to a composite image of clothes with the second pattern and the first shape; when the clothing information and the pattern information obtained by the controller are the second clothing information and the first pattern information, the controller combines the second clothing data and the first pattern data to create composite data corresponding to a composite image of clothes with the first pattern and the second shape; and when the clothing information and the pattern information obtained by the controller are the second clothing information and the second pattern information, the controller combines the second clothing data and the second pattern data to create composite data corresponding to a composite image of clothes with the second pattern and the second shape, and the output unit is configured to output the composite image corresponding to the composite data created by the controller to the display device.

Still another aspect of the present invention is a clothing design output method including an obtaining step, a composition step, and an output step, the obtaining step being a step of obtaining any of first clothing information and second clothing information as clothing information corresponding to a shape of clothes, the first clothing information corresponding to a first shape, the second clothing information corresponding to a second shape different from the first shape, the obtaining step obtaining any of first pattern information and second pattern information as pattern information corresponding to a pattern of clothes, the first pattern information corresponding to a first pattern, the second pattern information corresponding to a second pattern different from the first pattern, the composition step being: when the clothing information and the pattern information obtained by the obtaining step are the first clothing information and the first pattern information, a step of combining first clothing data and first pattern data to create composite data corresponding to a composite image of clothes with the first pattern and the first shape, the first clothing data corresponding to clothes with the first shape associated with the first clothing information, the first pattern data corresponding to the first pattern associated with the first pattern information; when the clothing information and the pattern information obtained by the obtaining step are the first clothing information and the second pattern information, a step of combining the first clothing data and second pattern data to create composite data corresponding to a composite image of clothes with the second pattern and the first shape, the second pattern data corresponding to the second pattern associated with the second pattern information; when the clothing information and the pattern information obtained by the obtaining step are the second clothing information and the first pattern information, a step of combining second clothing data and the first pattern data to create composite data corresponding to a composite image of clothes with the first pattern and the second shape, the second clothing data corresponding to clothes with the second shape associated with the second clothing information; and when the clothing information and the pattern information obtained by the obtaining step are the second clothing information and the second pattern information, a step of combining the second clothing data and the second pattern data to create composite data corresponding to a composite image of clothes with the second pattern and the second shape, and the output step being a step of outputting the composite image corresponding to the composite data created by the composition step to a display device, the display device being configured to display the composite image.

These clothing design output system and clothing design output method allow a display device to display the composite image of clothes with a predetermined pattern and a predetermined shape according to obtained clothing information and pattern information. Making the display device large allows for displaying the clothes with the predetermined pattern and the predetermined shape in a large scale. By displaying the clothes with the predetermined pattern and the predetermined shape in a large scale, the sizes of the clothes in the composite image and of the actual clothes have close values, and failures caused by the difference in the perceived colors due to the area effect are solved beforehand.

Advantageous Effects of the Invention

The present invention can obtain a clothing design display system, a clothing production system, a clothing design output system, and a clothing design output method. The systems and the method of the present invention allow a display device to display, in the design phase, a composite image with an impression close to an impression felt from custom-made clothes after completion.

BRIEF DESCRIPTION OF THE DRAWINGS

FIG. 8 illustrates a state in which a display target is a first front image.

FIG. 9 illustrates a state in which the display target is a first back image.

FIG. 10 illustrates a state in which the display target is a first side image.

FIG. 14 illustrates a front, a back, and a side.

FIG. 20 is a drawing illustrating another example of a clothing design display system and a clothing production system.

DESCRIPTION OF THE EMBODIMENTS

Figure 1:
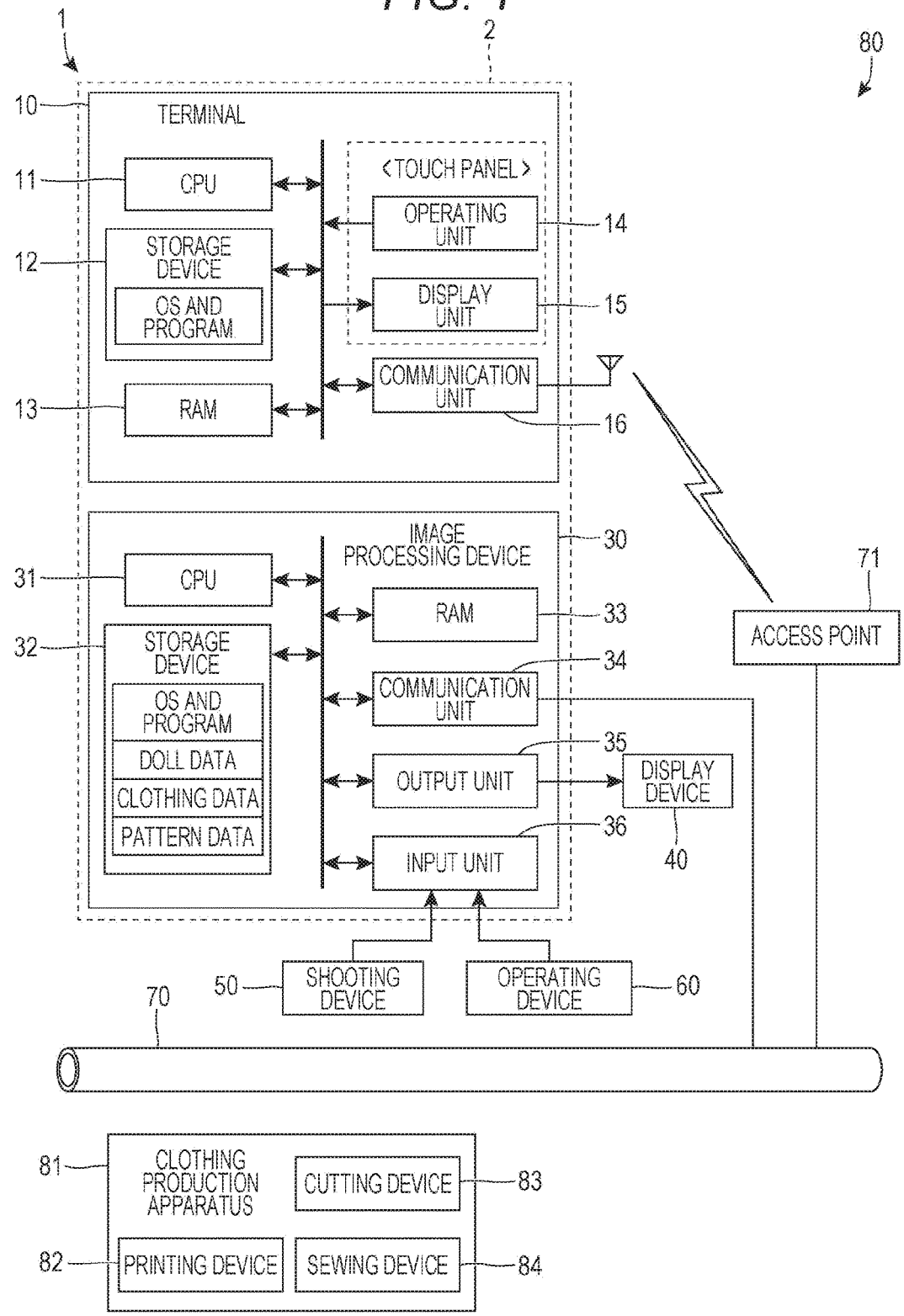
FIG. 1 is a drawing illustrating one example of a clothing design display system and a clothing production system.

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Another configuration may be included.

<Clothing Design Display System>

A clothing design display system 1 is described with reference to FIG. 1. A business operator uses the clothing design display system 1. The business operator is a person or an enterprise who customizes and sells clothes meeting the demands from the customer. The clothing design display system 1 allows for designing the clothes meeting the demands from the customer. The clothing design display system 1 displays a state in which the customer wears clothes designed by himself/herself. Before these clothes are actually completed, the customer can visually recognize and confirm the state in which the customer wears the clothes. In the embodiment, the customer for the previously mentioned business operator is referred to as a "wearer." The clothing design display system 1 is included in a clothing production system 80. The clothing production system 80 includes the clothing design display system 1 and a clothing production apparatus 81. The clothing production apparatus 81 produces clothes. That is, the clothing production system 80 designs the clothes meeting the demands from the customer and produces the designed clothes.

The clothing design display system 1 includes a terminal 10, an image processing device 30, and a display device 40. The terminal 10 and the image processing device 30 are connected to allow for data communications. Predetermined data is communicated between the terminal 10 and the image processing device 30. In the embodiment, the terminal 10 communicates the data with the image processing device 30 via a network 70. An access point 71 is disposed at the network 70. The terminal 10 is connected to the access point 71 by wireless connection. The image processing device 30 is connected to the network 70 by wired connection. In the embodiment, such connection forms are described as the examples. Note that the connection form of the terminal 10 to the network 70 array also be a wired connection. The connection form of the image processing device 30 to the network 70 may also be a wireless connection via the access point 71.

The display device 40 is connected to the image processing device 30. Further, a shooting device 50 and an operating device 60 are connected to the image processing device 30. The embodiment employs a wired connection with a connection method described below, as the connection form of the image processing device 30 with the display device 40, as the connection form of the image processing device 30 with the shooting device 50, and as the connection form of the image processing device 30 with the operating device 60. Note that the connection form of the image processing device 30 with a part of or all of the display device 40, the shooting device 50, and the operating device 60 may also be the wireless connection.

The terminal 10 is an information processing apparatus. For example, a portable information processing apparatus is employed as the terminal 10. For example, a tablet terminal or a notebook personal computer is employed as the terminal 10. The embodiment employs a tablet terminal as the terminal 10 (see FIGS. 5 to 10 described below). The terminal 10 accepts the demands from the wearer regarding the design of the clothes. The terminal 10 displays a first composite image. Other descriptions regarding the terminal 10 will be described below. The first composite image will also be described below.

The image processing device 30 is an information processing apparatus. For example, a desktop personal computer is employed as the image processing device 30. The image processing device 30 is an information processing apparatus that executes a composition process on target predetermined image data. This composition process is executed in accordance with each piece of information from the terminal 10 (see S85 in FIG. 11, FIG. 18, and FIG. 19 described below). In the image processing device 30, by the composition process, intermediate data is created, and further, first composite data and second composite data are created. The image processing device 30 transmits the first composite data to the terminal 10. Other descriptions regarding the image processing device 30 will be described below. The intermediate data, the first composite data, and the second composite data will also be described below.

The display device 40 is, for example, a liquid crystal display. Note that the display device 40 may also be a display of a different type from the liquid crystal. For example, the display device 40 may also be a projector. The display device 40 displays a second composite image output from the image processing device 30. The second composite image will be described below. A screen size of the display device 40 may be configured to display the display target second composite image with a size to the extent of corresponding to a height of the wearer when the display device 40 is installed with a longitudinal direction of the display device 40 in a vertical direction (see FIGS. 15 to 17 described below). For example, the display device 40 may be a display with a screen size of around 70 inches. The specific screen size is properly determined taking the previously mentioned points into consideration. A known display can be employed as the display device 40. Therefore, other descriptions regarding the display device 40 are omitted.

The shooting device 50 is a camera. The shooting device 50 shoots the wearer. For example, the shooting device 50 shoots a front, a back, and sides of the wearer. In the embodiment, the shot target by the shooting device 50 is the front of the wearer, the back of the wearer, and any one of the right and the left sides of the wearer. When any one of the right and the left sides of the wearer is the shot target, which side to be set as the shot target is properly determined taking various circumstances into consideration. Both the right and the left sides of the wearer may also be the shot target. The embodiment sets the right side of the wearer as the shot target. Shot data corresponding to the shot image shot by the shooting device 50 is input to the image processing device 30 via a signal cable compatible with a connection method described below. In the embodiment, the shot image shot by the shooting device 50 is a still image. Therefore, the shot data is image data of still image. As the shooting device 50, a known camera can be employed. Therefore, other descriptions related to the shooting device 50 are omitted. The operating device 60 will be described below.

The terminal 10 and the image processing device 30 constitute a clothing design output system 2 as a subsystem in the clothing design display system 1. That is, the clothing design display system 1, as described below, designs the clothes meeting the demands from the customer with the terminal 10 and the image processing device 30. The image including the designed clothes (the second composite image) is output to the display device 40.

<Terminal>

The terminal 10 is described with reference to FIG. 1. The terminal 10 includes a CPU 11, a storage device 12, a RAM 13, an operating unit 14, a display unit 15, and a communication unit 16. The CPU 11 is a controller of the terminal 10 to control the terminal 10. The CPU 11 executes arithmetic processes and controls the terminal 10. The storage device 12 is, for example, a flash memory. Note that the storage device 12 may also be a storage medium different from the flash memory. For example, the storage device 12 may also be a hard disk. The storage device 12 stores an operating system (OS) and various programs. The programs stored in the storage device 12 include a program for the acceptance process (see FIGS. 2 to 4). The acceptance process will be described below.

The RAM 13 serves as a storage area when the CPU 11 executes the OS and the various programs stored in the storage device 12. The RAM 13 stores predetermined information and data in a predetermined storage area in the middle of the execution of the process. In the terminal 10, the CPU 11 as the controller executes the OS and the various programs stored in the storage device 12. In association with this, the terminal 10 executes various processes, and functions corresponding to the executed processes are achieved.

The operating unit 14 accepts various instructions input to the terminal 10. The operating unit 14, like known tablet terminals, is configured to have a touchpad in the embodiment in which the terminal 10 is a tablet terminal. An operator of the terminal 10 executes an operation such as a tap, a pinch, a flick, and a swipe on the operating unit 14 by the touchpad. The operating unit 14 accepts the instruction according to each operation. In the embodiment, the operator of the terminal 10 is one or both of a shop assistant of the above-mentioned business operator and the wearer. The operating unit 14 may also include a predetermined hardware key. Further, the operating unit 14 may also be a keyboard and a computer mouse. The CPU 11 obtains the predetermined instruction accepted by the operating unit 14 via the operating unit 14.

The display unit 15 displays predetermined information. For example, the display unit 15 displays a figure selection screen (see FIG. 5), a clothing selection screen (see FIG. 6), a pattern selection screen (see FIG. 7), and a confirmation screen (see FIGS. 8 to 10). The respective screens illustrated in FIGS. 5 to 10 will be described below. The display unit 15 is, for example, configured to have a liquid crystal display. When the terminal 10 is a tablet terminal, the operating unit 14 by a touchpad and the display unit 15 are integrated to constitute a touch panel.

The communication unit 16 is a network interface compatible with the wireless LAN communication method. The communication unit 16 connects the terminal 10 to the network 70 via wireless communication with the access point 71. The communication unit 16 executes data communications with the image processing device 30. In the terminal 10, the communication unit 16 transmits predetermined information and instructions to the image processing device 30, in the terminal 10, the communication unit 16 receives the predetermined data transmitted from the image processing device 30.

The terminal 10 differs from known information processing apparatuses in that the storage device 12 stores the program for the acceptance process FIGS. 2 to 4) described below. Note that the terminal 10 is an apparatus identical to a known information processing apparatus in terms of hardware. Therefore, the descriptions are omitted, but the terminal 10, in addition to the above-mentioned respective units, includes a configuration provided to known information processing apparatuses.

<Image Processing Device>

The image processing device 30 is described with reference to FIG. 1. The image processing device 30 includes a CPU 31, a storage device 32, a RAM 33, a communication unit 34, an output unit 35, and an input unit 36. The CPU 31 is a controller of the image processing device 30 to control the image processing device 30. The CPU 31 executes arithmetic processes and controls the image processing device 30. The storage device 32 is, for example, one or both of a hard disk and a flash memory. The storage device 32 stores the OS and various programs. The programs stored in the storage device 32 include a program for the output process (see FIGS. 11 to 13), a program for the first composition process (see FIG. 18), and a program for the second composition process (see FIG. 19). The program for the second composition process includes an image analysis program to recognize and extract a head of a human. The output process, the first composition process, and the second composition process will be described below. Further, the storage device 32 stores various data. The data stored in the storage device 32 include a plurality of doll data, a plurality of clothing data, and a plurality of pattern data.

The doll data is image data corresponding to a doll with a predetermined figure. The storage device 32 stores a plurality of doll data corresponding to dolls with different figures. In the embodiment, described are three kinds of examples, a large size, a medium size, and a small size as figure information corresponding to the figure of the wearer. A magnitude relationship among the respective sizes, the large size, the medium size, and the small seize, is: "large size>medium size>small size," In the embodiment, the figure information corresponding to the large size is referred to as "figure information L," and the figure information corresponding to the medium size is referred to as "figure information M," and the figure information corresponding to the small size is referred to as "figure information S." When the figure information L, M, and S are not discriminated or these are collectively referred to, the figure information L, M, and S are referred to as "figure information." Further, the storage device 32 stores doll data corresponding to the front of a doll, doll data corresponding to the back of a doll, and doll data corresponding to the side of a doll for each size. That is, in the embodiment based on the respective sizes, the large size, the medium size, and the small size, nine pieces of doll data in total are stored in the storage device 32.

When the front, the back, and the side regarding large size doll data are not discriminated or these are collectively referred to, the large size doll data is referred to as "doll data L." The doll data L is associated with the figure information L. When the front, the back, and the side regarding medium size doll data are not discriminated or these are collectively referred to, the medium size doll data is referred to as "doll data M." The doll data M is associated with the figure information M. When the front, the back, and the side regarding small size doll data are not discriminated or these are collectively referred to, the small size doll data is referred to as "doll data S." The doll data S is associated with the figure information S. When the front, the back, and the side are not discriminated and the doll data L, M, and S are not discriminated or these are collectively referred to, these are referred to as "doll data." When the front, the back, and the side of the doll data with the respective sizes, the large size, the medium size, and the small seize, are discriminated, for example, using the doll data M as the example, the doll data is referred to as "front doll data M," "back doll data M," and "side doll data M."

In the embodiment, the horizontal direction (see FIG. 5 described below) size differs among a doll corresponding to the doll data L, a doll corresponding to the doll data M, and a doll corresponding to the doll data S. The previously mentioned respective dolls have an identical size in a direction (see the "vertical direction" in FIG. 5 described below) orthogonal to the horizontal direction. That is, the doll data L is image data corresponding to a doll that has a height of a first value and has a width direction size of a first width at a predetermined position. The first value is a predetermined value in a range of, for example, 140 cm to 175 cm. The doll data M, for example, is image data corresponding to a doll that has a height of the first value and has a width direction size of a second width at the position identical to the previously mentioned position. The second width is a width direction size smaller than the first width (second width<first width). The doll data S, for example, is image data corresponding to a doll that has a height of the first value and has a width direction size of a third width at the position identical to the previously mentioned position. The third width is a width direction size smaller than the second width (third width<second width). In the doll data L, M, and S, the heights of the dolls corresponding to the respective data may also have different sizes. For example, the doll data L may also correspond to the doll with the greatest height. The doll data M may also correspond to a doll with a height lower than that of the large size. The doll data S may also correspond to a doll with a height lower than that of the medium size.

Figure 6:
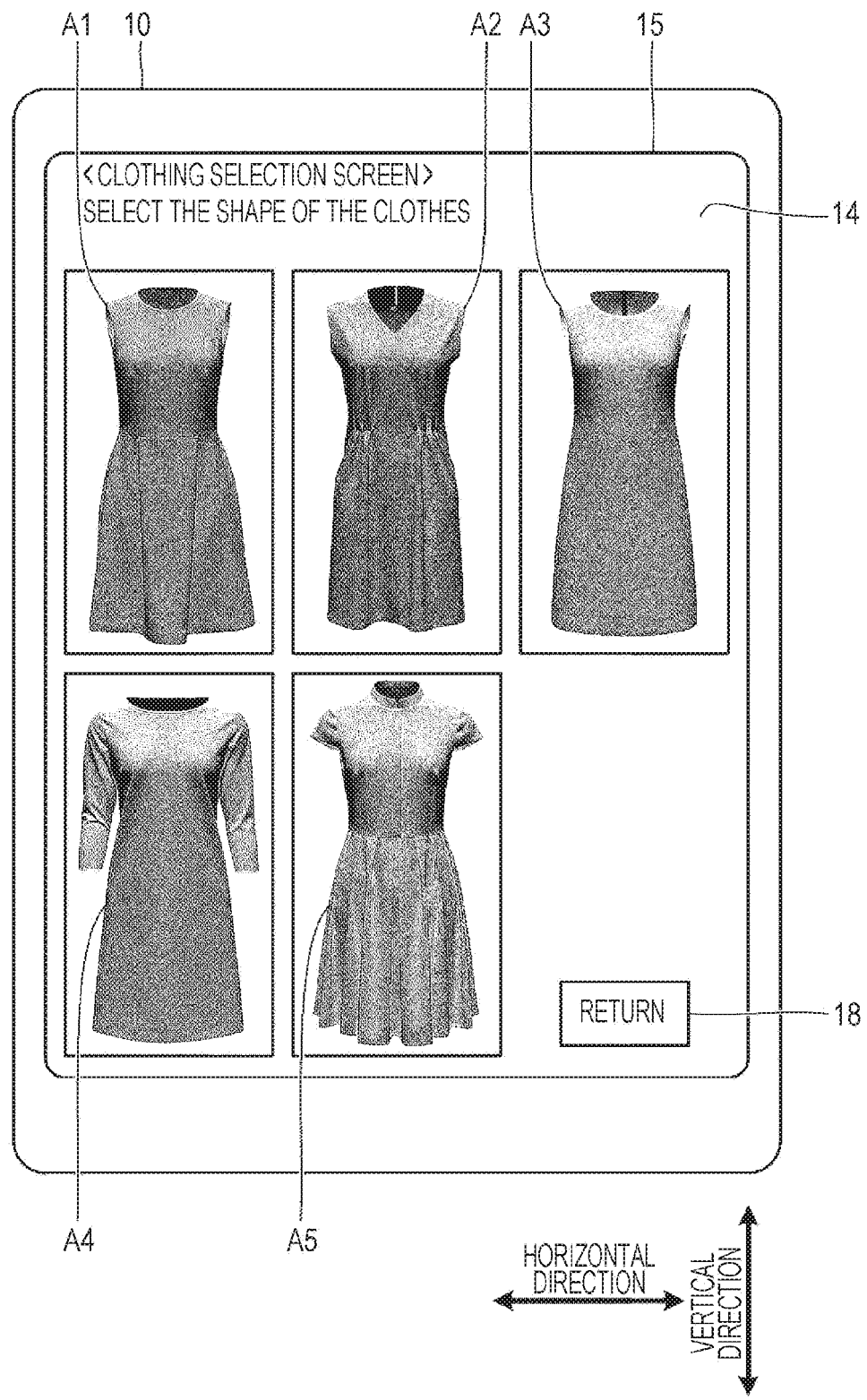
FIG. 6 is a drawing illustrating one example of a clothing selection screen.

The clothing data is image data corresponding to clothes with a predetermined shape. The storage device 32 stores a plurality of clothing data corresponding to clothes with different shapes. Examples of the shapes of clothes are: sleeveless, short sleeve, cut and sewn, shirt, blouse, one-piece, cardigan, vest, jacket, coat, skirt, and trousers. Further, these shapes of clothes include the respective shapes of subdivided clothes of an identical type. For example, one-pieces with the respective different shapes are regarded as clothes with different shapes (one-pieces) in one-pieces. In the embodiment, described are examples of clothes (one-pieces) with five kinds of shapes as illustrated in FIG. 6 described below as shapes of clothes. Further, the storage device 32 stores clothing data corresponding to the front of clothes, clothing data corresponding to the back of clothes, and clothing data corresponding to the side of clothes for each shape of clothes. That is, in the embodiment based on the five kinds of respective shapes, fifteen pieces of clothing data in total are stored in the storage device 32.

When the front, the back, and the side regarding respective clothing data corresponding to clothes (one-pieces) with the respective shapes are not discriminated or these are collectively referred to, the clothing data corresponding to the clothes (one-pieces) with the respective shapes are each referred to as "clothing data A1," "clothing data A2," "clothing data A3," "clothing data A4," and "clothing data A5." The clothing data A1 is associated with clothing informational. The clothing data A2 is associated with clothing information A2. The clothing data. A3 is associated with clothing information A3. The clothing data A4 is associated with clothing information A4. The clothing data A5 is associated with clothing information A5. The clothing information is information to identify the clothes with different shapes. When the front, the back, and the side are not discriminated and the clothing data A1, A2, A3, 44, and A5 are not discriminated or these are collectively referred to, these are referred to as "clothing data." When the front, the back, and the side of the clothing data with the respective shapes are discriminated, for example, using the clothing data A3 as the example, these are referred to as "front clothing data A3." "back clothing data A3," and "side clothing data 43." When the clothing information A1, A2, A3, A4, and A5 are not discriminated or these are collectively referred to, these are referred to as "clothing information."

Figure 7:
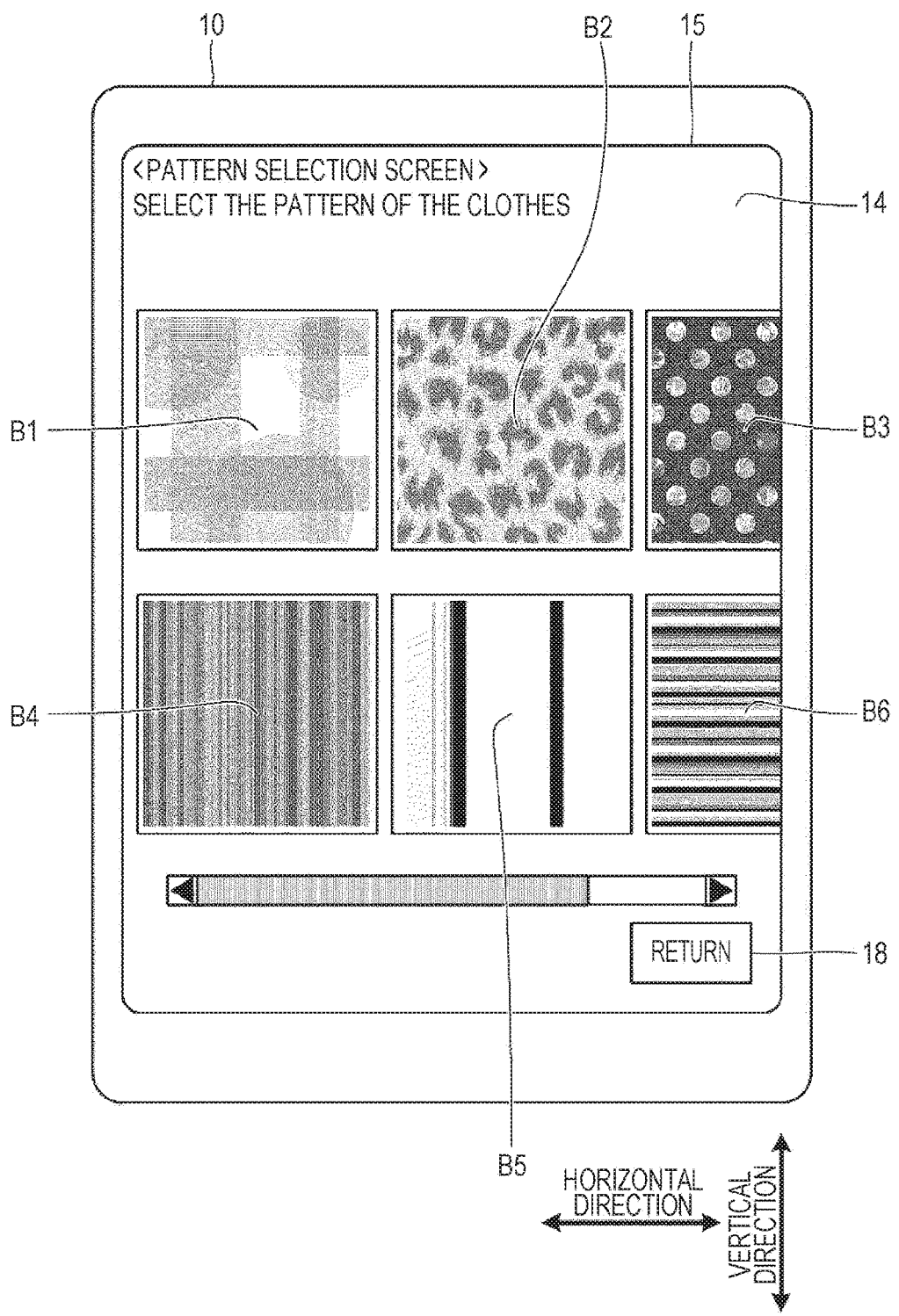
FIG. 7 is a drawing illustrating one example of a pattern selection screen.

The pattern data is image data corresponding to a predetermined pattern. The storage device 32 stores a plurality of pattern data corresponding to different patterns. For example, a pattern can be defined by coloring and patterning. In this case, the previously mentioned different patterns mean that any one of the coloring and the patterning is different. Plain is one patterning. In the embodiment, described are examples of six kinds of patterns as illustrated in FIG. 7 described below as patterns for clothes. The pattern data corresponding to the respective patterns are each referred to as "pattern data B1," "pattern data B2," "pattern data B3," "pattern data B4," "pattern data B5," and "pattern data B6." The pattern data B1 is associated with pattern information B1. The pattern data B2 is associated with pattern information B2. The pattern data B3 is associated with pattern information B3. The pattern data B4 is associated with pattern information B4. The pattern data B5 is associated with pattern information B5. The pattern data B6 is associated with pattern information B6. The pattern information is information to identify the pattern of the clothes. When the pattern data B1, B2, B3, B4, B5, and B6 are not discriminated or these are collectively referred to, these are referred to as "pattern data." When the pattern information B1, B2, B3, B4, B5, and B6 are not discriminated or these are collectively referred to, these are referred to as "pattern information."

The RAM 33 serves as a storage area when the CPU 31 executes the OS and the various programs stored in the storage device 32. The RAM 33 stores predetermined information and data in a predetermined storage area in the middle of the execution of the process. The RAM 33 may also store a plurality of doll data, a plurality of clothing data, and a plurality of pattern data. Note that, in the embodiment, the storage device 32 stores the plurality of doll data, the plurality of clothing data, and the plurality of pattern data as mentioned above. In the image processing device 30, the CPU 31 as the controller executes the OS and the various programs stored in the storage device 32. In association with this, the image processing device 30 executes various processes, and functions corresponding to the executed processes are achieved.

The communication unit 34 is a network interface compatible with the wired LAN communication method. The communication unit 34 connects the image processing device 30 to the network 70. The communication unit 34 executes data communications with the terminal 10. In the image processing device 30, the communication unit 34 receives the predetermined information and instruction transmitted from the terminal 10. In the image processing device 30, the communication unit 34 transmits the predetermined data to the terminal 10.

The output unit 35 and the input unit 36 are connection interfaces to connect a predetermined external device to the image processing device 30. The display device 40 is connected to the output unit 35. The shooting device 50 and the operating device 60 are connected to the input unit 36. In the image processing device 30, the output unit 35 outputs an image displayed in the display device 40 to the display device 40. The shot data from the shooting device 50 is input to the input unit 36. The operating device 60 connected to the input unit 36 accepts various instructions input to the image processing device 30. The operating device 60 includes a known keyboard and a known computer mouse. The output unit 35 and the input unit 36 are, for example, connection interfaces compatible with one or both of the connection methods of High-Definition Multimedia Interface (registered trademark) (HDMI) and Universal Serial Bus (USB). With the output unit 35 and the input unit 36 compatible with both HDMI (registered trademark) and USB, the output unit 35 and the input unit 36 include a connection interface compatible with HDMI (registered trademark) and a connection interface compatible with USB. The respective connections of the image processing device 30 with the display device 40, the shooting device 50, and the operating device 60 may also be different connection methods. For example, the image processing device 30 may connect with the respective display device 40 and shooting device 50 with the HDMI (registered trademark) connection methods, and the image processing device 30 may connect with the operating device 60 with the USB connection method. The previously mentioned connection methods of the respective connections of the image processing device 30 with the display device 40, the shooting device 50, and the operating device 60 are exemplified. For example, the connection between the image processing device 30 and the shooting device 50 may also have a USB connection method. When the connection of the image processing device 30 with the display device 40 is the wireless connection, the output unit 35 includes a predetermined interface for the wireless connection. When the connections of the image processing device 30 with the shooting device 50 and the operating device 60 are wireless connections, or, the connection of the image processing device 30 with the shooting device 50 or the operating device 60 is a wireless connection, the input unit 36 includes predetermined interfaces for the wireless connections.

The image processing device 30 differs from known information processing apparatuses in that the storage device 32 stores, as described below, the program for the output process (see FIGS. 11 to 13), the program for the first composition process (see FIG. 18), and the program for the second composition process (see FIG. 19). Note that the image processing device 30 is an apparatus identical to a known information processing apparatus in terms of hardware. Therefore, the descriptions are omitted, but the image processing device 30, in addition to the above-mentioned respective units, includes a configuration provided to known information processing apparatuses.

<Acceptance Process>

The acceptance process executed by the terminal 10 is described with reference to FIGS. 2 to 10. For convenience of description, regarding the terminal 10 illustrated in FIGS. 5 to 10, a direction orthogonal to a "horizontal direction" illustrated in FIGS. 5 to 10 with a front view state of FIGS. 5 to 10 as the reference is referred to as a "vertical direction." For example, the above-mentioned shop assistant of the business operator inputs a start instruction for the acceptance process to the terminal 10. The operating unit 14 accepts the input start instruction. The CPU 11 obtains the start instruction via the operating unit 14. In response to the acquisition of the start instruction, the CPU 11 starts the program for the acceptance process stored in the storage device 12. In association with this, the acceptance process starts. The CPU 11 that has started the acceptance process controls the display of the figure selection screen (S11). The CPU 11 outputs a display command for the figure selection screen to the display unit 15. In association with this, the display unit 15 displays the figure selection screen (see FIG. 5). Subsequently, the CPU 11 determines whether the figure information has been obtained (S13). When the figure information has not been obtained (S13: No), the CPU 11 repeatedly executes this determination.

Figure 5:
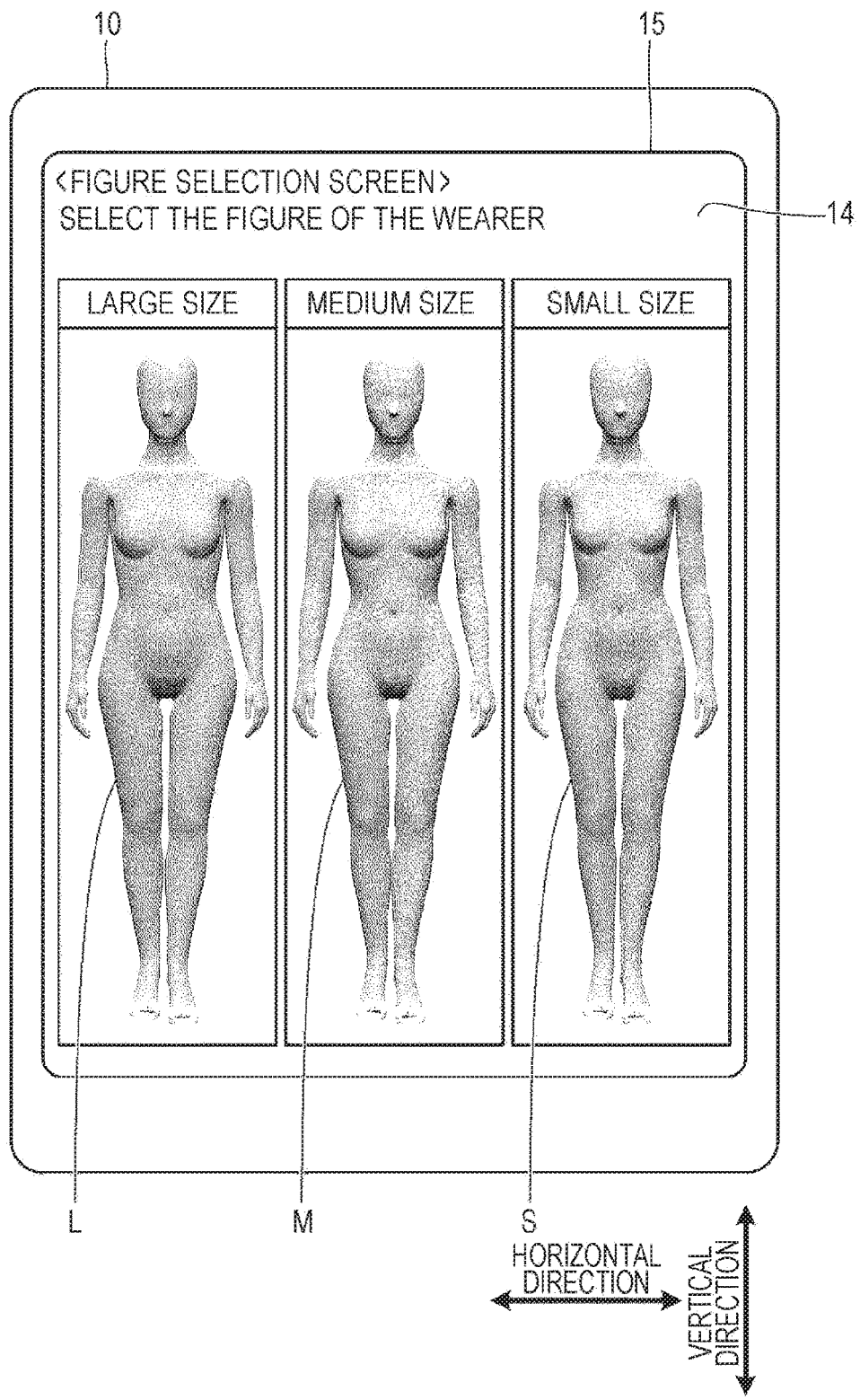
FIG. 5 is a drawing illustrating one example of a figure selection screen.

The figure selection screen is a screen to select the figure of the wearer. The embodiment is based on the respective sizes, the large size, the medium size, and the small size. Therefore, as illustrated in FIG. 5, the figure selection screen includes doll images L, M, and S as the options. The doll images L, M, and S included in the figure selection screen are included in the figure selection screen as follows. That is, at S11, the CPU 11 outputs a transmission command for the request instruction to the communication unit 16 to control the above-mentioned display. The request instruction transmitted at this timing is an instruction requesting the transmissions of the image data corresponding to the doll image L, the image data corresponding to the doll image M, and the image data corresponding to the doll image S to the image processing device 30. In association with this, the communication unit 16 transmits the request instruction to the image processing device 30. In the image processing device 30, the communication unit 34 receives the request instruction. In the image processing device 30, the communication unit 34 transmits the respective image data corresponding to the doll images L, M, and S to the terminal 10. In the terminal 10, the communication unit 16 receives the respective image data corresponding to the doll images L, M, and S. The CPU 11 obtains the respective image data corresponding to the doll images L, M, and S via the communication unit 16. Subsequently, the CPU 11 obtains the doll images L, M, and S from the previously mentioned respective image data, and includes the obtained doll images L, M, and S in the figure selection screen. Note that the respective image data corresponding to the doll images L, M, and S may be associated with the program for the acceptance process to be stored in the storage device 12. In this case, the CPU 11 obtains the respective image data corresponding to the doll images L, M, and S from the storage device 12.

In the embodiment, the doll images L, M, and S are at the front of the doll. The doll image L is a reduced image corresponding to the front doll data L. A thumbnail image is exemplified as the reduced image. The doll image L is associated with the figure information L. The doll image M is a reduced image corresponding to the front doll data M. The doll image M is associated with the figure information M. The doll image S is a reduced image corresponding to the front doll data S. The doll image S is associated with the figure information S. When the doll images L, M, and S are not discriminated or these are collectively referred to, these are referred to as a "doll image."

The doll image is selected, for example, by a tap operation to the operating unit 14 on the selected doll image. The shop assistant or the wearer executes the tap operation to the operating unit 14 on the doll image matching the figure of or having the closest figure to the wearer. When the operating unit 14 accepts the tap operation selecting the doll image, the CPU 11 obtains the figure information associated with the selection-target doll image. For example, suppose that the tap operation is executed to the operating unit 14 on the doll image M. In this case, the CPU 11 obtains the figure information M associated with the doll image M. When the figure information has been obtained (S13: Yes), the CPU 11 controls the transmission of the obtained figure information (S15). The CPU 11 outputs a transmission command for the figure information to the communication unit 16. In association with this, the communication unit 16 transmits the figure information to the image processing device 30.

After the execution of S15, the CPU 11 controls the display of the clothing selection screen (S17). The CPU 11 outputs a display command for the clothing selection screen to the display unit 15. In association with this, the display unit 15 displays the clothing selection screen (see FIG. 6). Subsequently, the CPU 11 determines whether the clothing information has been obtained (S19). When the clothing information has not been obtained (S19: No), the CPU 11 repeatedly executes this determination.

The clothing selection screen is a screen to select the shape of the clothes that the wearer attempts to purchase. The embodiment is based on the clothes with live kinds of shapes. Therefore, as illustrated in FIG. 6, the clothing selection screen includes clothing images A1, A2. A3, A4, and A5 as the options. The clothing images A1, A2, A3, A4, and A5 included in the clothing selection screen are included in the clothing selection screen as follows. That is, at S17, the CPU 11 outputs a transmission command for the request instruction to the communication unit 16 to control the above-mentioned display. The request instruction transmitted at this timing is an instruction requesting the transmissions of the image data corresponding to the clothing image A1, the image data corresponding to the clothing image A2, the image data corresponding to the clothing image A3, the image data corresponding to the clothing image A4, and the image data corresponding to the clothing image A5 to the image processing device 30. In association with this, the communication unit 16 transmits the request instruction to the image processing device 30. In the image processing device 30, the communication unit 34 receives the request instruction. In the image processing device 30, the communication unit 34 transmits the respective image data corresponding to the clothing images A1, A2, A3, A4, and A5 to the terminal 10. In the terminal 10, the communication unit 16 receives the respective image data corresponding to the clothing images A1, A2, A3, A4, and A5. The CPU 11 obtains the respective image data corresponding to the clothing images A1, A2, A3, A4, and A5 via the communication unit 16. Subsequently, the CPU 11 obtains the clothing images A1, A2, A3, A4, and A5 from the previously mentioned respective image data and includes the clothing images A1, A2, A3, A4, and A5 in the clothing selection screen. Note that the respective image data corresponding to the clothing images A1, A2, A3, A4, and A5 may be associated with the program for the acceptance process to be stored in the storage device 12. In this case, the CPU 11 obtains the respective image data corresponding to the clothing images A1, A2, A3, A4, and A5 from the storage device 12.

In the embodiment, the clothing images A1, A2, A3, A4, and A5 are at the front of the clothes. The clothing image A1 is a reduced image corresponding to the clothing data A1. The clothing image A1 is associated with the clothing information A1. The clothing image A2 is a reduced image corresponding to the clothing data A2. The clothing image A2 is associated with the clothing information A2. The clothing image A3 is a reduced image corresponding to the clothing data A3. The clothing image A3 is associated with the clothing information A3. The clothing image A4 is a reduced image corresponding to the clothing data A4. The clothing image A4 is associated with the clothing information A4. The clothing image A5 is a reduced image corresponding to the clothing data A5. The clothing image A5 is associated with the clothing information A5. When the clothing images A1, A2, A3, A4, and A5 are not discriminated or these are collectively referred to, these are referred to as a clothing image.

The clothing image is selected, for example, by the tap operation to the operating unit 14 on the selected clothing image. The shop assistant or the wearer executes the tap operation to the operating unit 14 on the clothing image of the clothes with the shape that the wearer attempts to purchase. The clothing selection screen includes a return button 18 (see FIG. 6). The return button 18 is made to correspond to a movement instruction that switches the screen currently displayed in the display unit 15 to the screen displayed prior to this screen. Suppose that, the tap operation is executed to the operating unit 14 on the return button 18 during the display of the clothing selection screen, and that the operating unit 14 accepts this tap operation. In this case, the CPU 11 returns the process to S11. In FIG. 2, the illustration of such process procedure via the return button 18 is omitted.

When the operating unit 14 accepts the tap operation to select the clothing image, the CPU 11 obtains the clothing information associated with the selection-target clothing image. For example, suppose that the tap operation is executed to the operating unit 14 on the clothing image A3. In this case, the CPU 11 obtains the clothing information A3 associated with the clothing image A3. When the clothing information has been obtained (S19: Yes), the CPU 11 controls the transmission of the obtained clothing information (S21). The CPU 11 outputs a transmission command for the clothing information to the communication unit 16. In association with this, the communication unit 16 transmits the clothing information to the image processing device 30.

After the execution of S21, the CPU 11 controls the display of the pattern selection screen (S23). The CPU 11 outputs a display command for the pattern selection screen to the display unit 15. In association this, the display unit 15 displays the pattern selection screen (see FIG. 7). Subsequently, the CPU 11 determines whether the pattern information has been obtained (S25). When the pattern information has not been obtained (S25: No), the CPU 11 repeatedly executes this determination.

The pattern selection screen is a screen to select the pattern of the clothes that the wearer attempts to purchase. The embodiment is based on six kinds of patterns. Therefore, as illustrated in FIG. 7, the pattern selection screen includes pattern images B1, B2, B3, B4, B5, and B6 as the options. The pattern images B1, B2, B3, B4, B5, and B6 included in the pattern selection screen are included in the pattern selection screen as follows. That is, at S23, the CPU 11 outputs a transmission command for the request instruction to the communication unit 16 to control the above-mentioned display. The request instruction transmitted at this timing is an instruction requesting the transmissions of the image data corresponding to the pattern image B1, the image data corresponding to the pattern image B2, the image data corresponding to the pattern image B3, the image data corresponding to the pattern image B4, the image data corresponding to the pattern image B5, and the image data corresponding to the pattern image B6 to the image processing device 30, in association with this, the communication unit 16 transmits the request instruction to the image processing device 30. In the image processing device 30, the communication unit 34 receives the request instruction. In the image processing device 30, the communication unit 34 transmits the respective image data corresponding to the pattern images B1, B2, B3, B4, B5, and B6 to the terminal 10. In the terminal 10, the communication unit 16 receives the respective image data corresponding to the pattern images B1, B2, B3, B4, B5, and B6. The CPU 11 obtains the respective image data corresponding to the pattern images B1, B2, B3, B4, B5, and B6 via the communication unit 16. Subsequently, the CPU 11 obtains the pattern images B1, B2, B3, B4, B5, and B6 from the previously mentioned respective image data and includes the pattern images B1, B2, B3, B4, B5, and B6 in the pattern selection screen. Note that the respective image data corresponding to the pattern images B1, B2, B3, B4, B5, and B6 may be associated with the program for the acceptance process to be stored in the storage device 12. In this case, the CPU 11 obtains the respective image data corresponding to the pattern images B1, B2, B3, B4, B5, and B6 from the storage device 12.

The pattern image B1 is a reduced image corresponding to the pattern data B1. The pattern image B1 is associated with the pattern information B1. The pattern image B2 is a reduced image corresponding to the pattern data B2. The pattern image B2 is associated with the pattern information B2. The pattern image B3 is a reduced image corresponding to the pattern data B3. The pattern image B3 is associated with the pattern information B3. The pattern image B4 is a reduced image corresponding to the pattern data B4. The pattern image B4 is associated with the pattern information B4. The pattern image B5 is a reduced image corresponding to the pattern data B5. The pattern image B5 is associated with the pattern information B5. The pattern image B6 is a reduced image corresponding to the pattern data B6. The pattern image B6 is associated with the pattern information B6. When the pattern images B1, B2, B3, B4, B5, and B6 are not discriminated or these are collectively referred to, these are referred to as a "pattern image."

The pattern image is selected, for example, by the tap operation to the operating unit 14 on the selected pattern image. To display the pattern images, like the pattern images B3 and BE illustrated in FIG. 7, displayed in a state of partially hidden, the shop assistant or the wearer executes the flick operation or the swipe operation in the horizontal direction to the operating unit 14 at a predetermined position on the screen of the display unit 15. Such operation is also executed similarly when a non-displayed pattern image is present. The movement direction may also be the vertical direction. Unlike the embodiment, the previously mentioned operation is executed also on the doll image and the clothing image to display the image displayed in the state of partially hidden or the non-displayed image.

The shop assistant or the wearer executes the tap operation to the operating unit 14 on the pattern image with the pattern that the wearer likes. The pattern selection screen includes the return button 18 (see FIG. 7). Suppose that when the tap operation is executed to the operating unit 14 on the return button 18 during the display of the pattern selection screen, the operating unit 14 accepts this tap operation. In this case, the CPU 11 returns the process to S11 or S17. Whether the return destination is S11 or S17 is properly decided taking various circumstances into consideration. In FIG. 2, the illustration of such process procedure via the return button 18 is omitted.

When the operating unit 14 accepts the tap operation selecting the pattern image, the CPU 11 obtains the pattern information associated with the selection-target pattern image. For example, suppose that the tap operation is executed to the operating unit 14 on the pattern image B1. In this case, the CPU 11 obtains the pattern information B1 associated with the pattern image B1. When the pattern information has been obtained (S25: Yes), the CPU 11 controls the transmission of the obtained pattern information (S27). The CPU 11 outputs a transmission command for the pattern information to the communication unit 16. In association with this, the communication unit 16 transmits the pattern information to the image processing device 30.

After the execution of S27, the CPU 11 determines whether the first composite data has been obtained (S29). The image processing device 30 transmits the first composite data obtained at S29 at S123 in FIG. 18 described below. The communication unit 16 receives the first composite data. The CPU 11 obtains the first composite data via the communication unit 16. The obtained first composite data is stored in the RAM 13. The first composite data obtained at S29 is first front data, first back data, and first side data, in the embodiment, the first composite data is a name of the composite data used when the first front data, the first back data, and the first side data are not discriminated or these are collectively referred to. The first front data is a composite image corresponding to the first front image. The first back data is a composite image corresponding to the first back image. The first side data is a composite image corresponding to the first side image.

The first front image is a composite image corresponding to the front of a doll who wears clothes with a pattern described as follows. The first back image is a composite image corresponding to the back of a doll who wears clothes with a pattern described as follows. The first side image is a composite image corresponding to the side of a doll who wears clothes with a pattern described as follows. The side of the doll is the side on the side identical to the side of the wearer shot by the shooting device 50. In the embodiment, the shot target by the shooting device 50 is a right side of the wearer. Therefore, the first side image is a composite image corresponding to the right side of the doll. The previously mentioned pattern is a pattern corresponding to the pattern data associated with the pattern information transmitted at S27. The previously mentioned clothes are clothes with the predetermined shape corresponding to the clothing data associated with the clothing information transmitted at S21. The previously mentioned doll is a doll with the predetermined figure corresponding to the doll data associated with the clothing information transmitted at S15. In the embodiment, when the first front image, the first back image, and the first side image are not discriminated or these are collectively referred to, these are referred to as a "first composite image." It can also be said that the first composite data is composite data corresponding to the first composite image. After the execution of S29, the CPU 11 transitions the process to S31 in FIG. 3.

At S31, the CPU 11 controls the display of the confirmation screen. An initial display target in the display of the confirmation screen is made the first front image. That is, the CPU 11 controls the display of the confirmation screen including the first front image in a display area R. The CPU 11 creates the first front image from the first front data stored in the RAM 13 and outputs a display command for the confirmation screen including this to the display unit 15. In association with this, the display unit 15 displays the previously mentioned confirmation screen (see FIG. 8).

Figure 8:
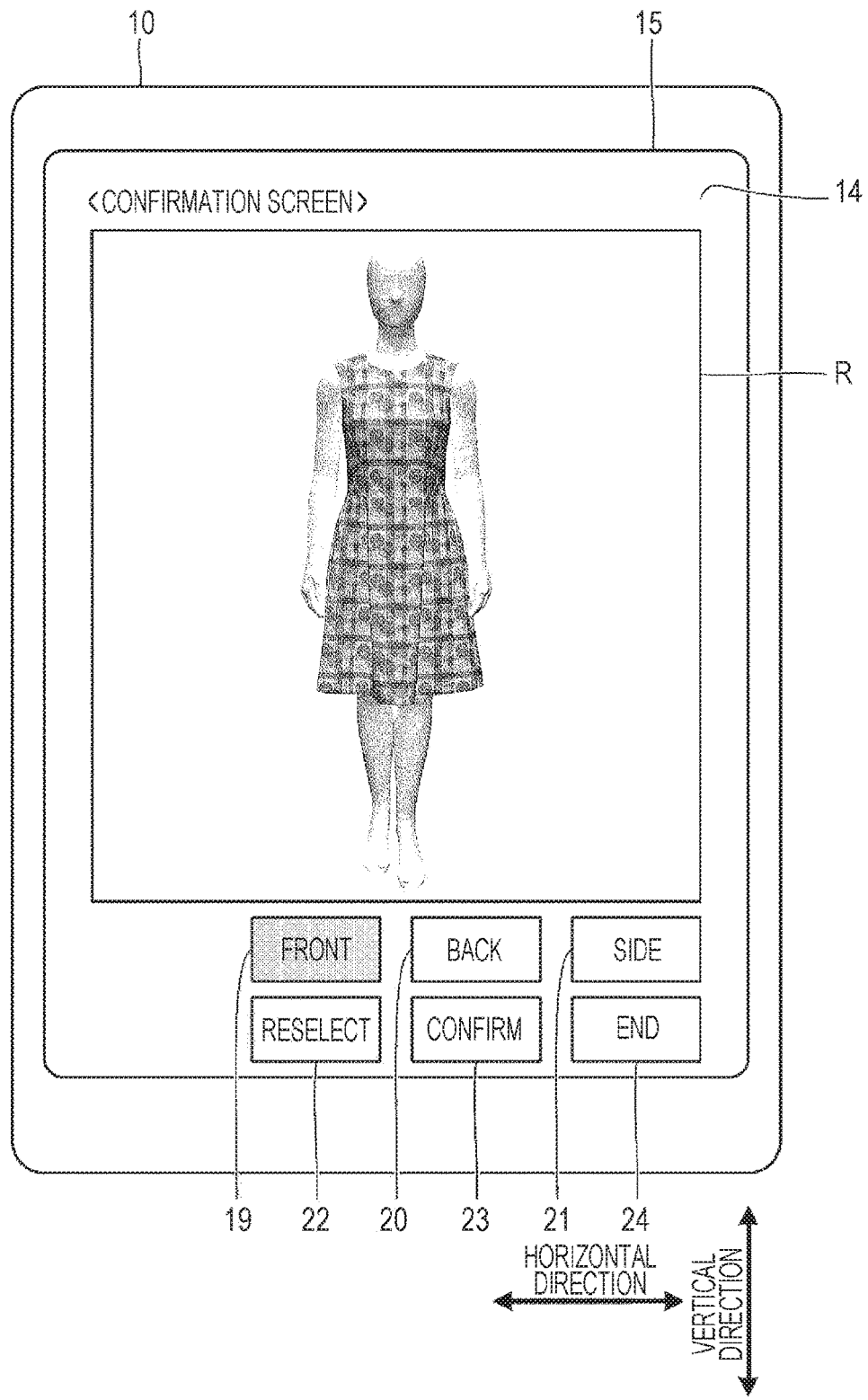
FIG. 8 is a drawing illustrating one example of a confirmation screen.

In addition to the display area R, the confirmation screen includes a front button 19, a back button 20, a side button 21, a reselect button 22, a confirm button 23, and an end button 24. The front button 19 is made to correspond to a front switching instruction that switches the first back image or the first side image displayed in the display area R to the first front image. The back button 20 is made to correspond to a back switching instruction that switches the first front image or the first side image displayed in the display area R to the first back image. The side button 21 is made to correspond to a side switching instruction that switches the first front image or the first back image displayed in the display area R to the first side image. Regarding the front button 19, the back button 20, and the side button 21, the buttons made correspond to the switching of the first composite image in display may be made non-display or grayed-out so as to enter a state not becoming the target for the tap operation. For example, when the first front image is displayed in the display area R, the front button 19 is made grayed-out. In FIG. 8, a halftone dot patterning given in the front button 19 indicates that the front button 19 is in a grayed-out state.

The reselect button 22 is made to correspond to a reselection instruction that reselects the shape and the pattern of the clothes. The confirm button 23 is made to correspond to a confirmation instruction that confirms the design of the clothes according to each piece of information (see S15, S21, and S27 in FIG. 2) transmitted to the image processing device 30. In the clothing design display system 1, the confirmation instruction may also be set as a purchase instruction of the clothes. The end button 24 is made to correspond to an end instruction that ends the acceptance process.

Suppose that the tap operation is executed to the operating unit 14 on the front button 19 and the operating unit 14 accepts this tap operation. In this case, the CPU 11 obtains the front switching instruction. Suppose that the tap operation is executed to the operating unit 14 on the back button 20 and the operating unit 14 accepts this tap operation. In this case, the CPU 11 obtains the back switching instruction. Suppose that the tap operation is executed to the operating unit 14 on the side button 21 and the operating unit 14 accepts this tap operation. In this case, the CPU 11 obtains the side switching instruction. Suppose that the tap operation is executed to the operating unit 14 on the reselect button 22 and the operating unit 14 accepts this tap operation. In this case, the CPU 11 obtains the reselection instruction. Suppose that the tap operation is executed to the operating unit 14 on the confirm button 23 and the operating unit 14 accepts this tap operation. In this case, the CPU 11 obtains the confirmation instruction. Suppose that the tap operation is executed to the operating unit 14 on the end button 24 and the operating unit 14 accepts this tap operation. In this case, the CPU 11 obtains the end instruction.

After the execution of S31, the CPU 11 determines whether the front switching instruction has been obtained (S33). As illustrated in FIG. 8, suppose that the first front image is displayed in the display area R. In this case, the front button 19 is grayed-out. Therefore, at least, the front switching instruction is not obtained. For example, when S33 is executed immediately after S31, S31 is not affirmed (S31: Yes) but is denied (S31: No).

When the front switching instruction has been obtained (S33: Yes), the CPU 11 controls the transmission of the front switching instruction (S35). The CPU 11 outputs a transmission command for the front switching instruction to the communication unit 16. In association with this, the communication unit 16 transmits the front switching instruction to the image processing device 30. Subsequently, the CPU 11 controls the display of the first front image (S37). The CPU 11 creates the first front image from the first front data stored in the RAM 13. Subsequently, the CPU 11 outputs, to the display unit 15, a display command that switches the display in the display area R on the confirmation screen to the first front image. In association with this, the display unit 15 displays the first front image in the display area R (see FIG. 8). As mentioned above, the front button 19 is grayed out. After the execution of S37, the CPU 11 returns the process to S33. Afterwards, the CPU 11 repeatedly executes the process at S33 and processes after S33.

Figure 9:
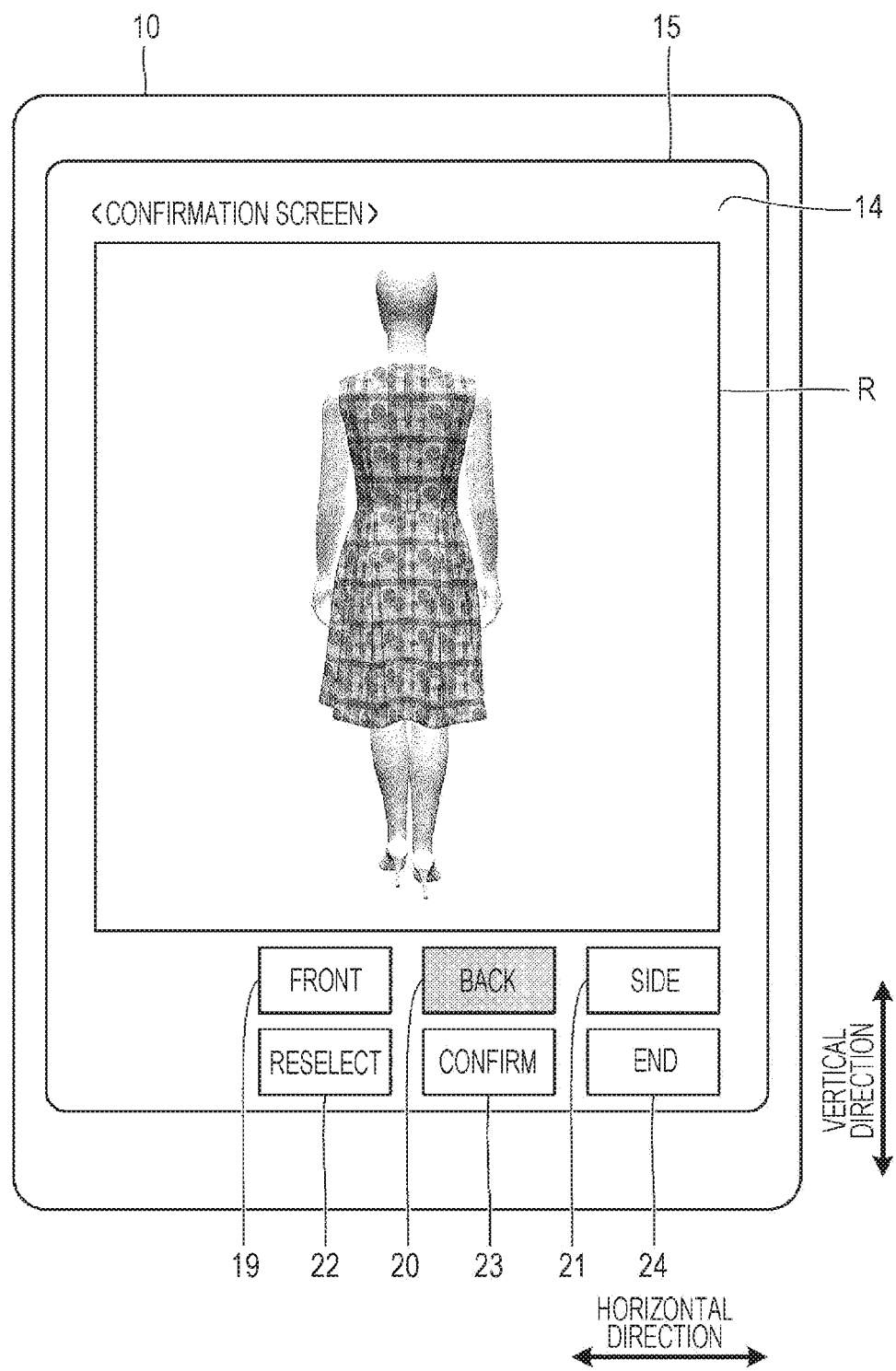
FIG. 9 is a drawing illustrating one example of the confirmation screen.

When the front switching instruction has not been obtained (S33: No), the CPU 11 determines whether the back switching instruction has been obtained (S39). As illustrated in FIG. 9, suppose that the first back image is displayed in the display area R. In this case, the back button 20 is grayed-out. Therefore, at least, the back switching instruction is not obtained. In FIG. 9, a halftone dot patterning given in the back button 20 indicates that the back button 20 is in a grayed-out state.

When the back switching instruction has been obtained (S39: Yes), the CPU 11 controls the transmission of the back switching instruction (S41). The CPU 11 outputs a transmission command for the back switching instruction to the communication unit 16. In association with this, the communication unit 16 transmits the back switching instruction to the image processing device 30. Subsequently, the CPU 11 controls the display of the first back image (S43), The CPU 11 creates the first back image from the first back data stored in the RAM 13. Subsequently, the CPU 11 outputs, to the display unit 15, a display command that switches the display in the display area R on the confirmation screen to the first back image. In association with this, the display unit 15 displays the first back image in the display area R (see FIG. 9). The back button 20 is grayed out. After the execution of S43, the CPU 11 returns the process to S33. Afterwards, the CPU 11 repeatedly executes the process at S33 and the processes after S33.

Figure 10:
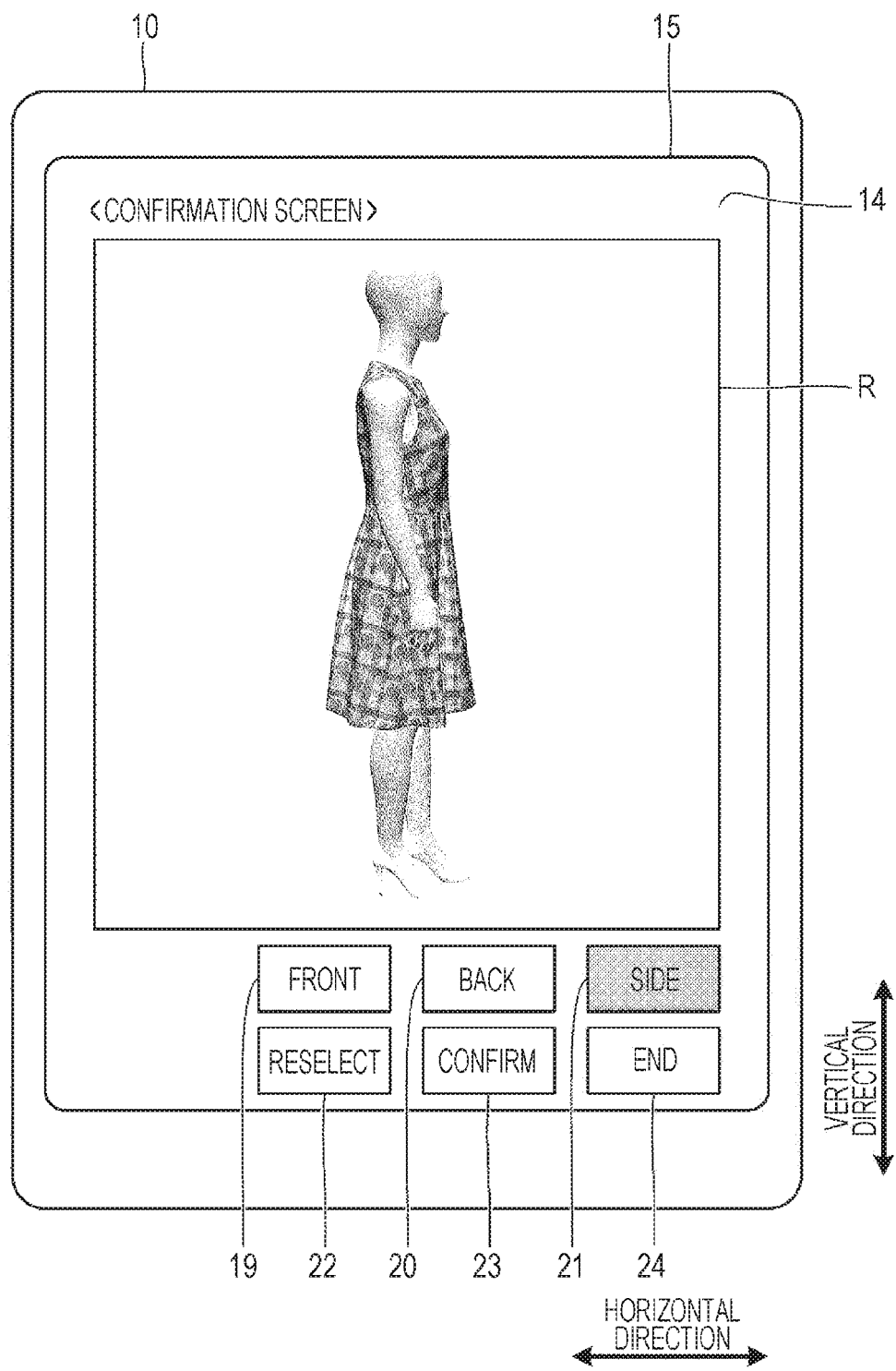
FIG. 10 is a drawing illustrating one example of the confirmation screen.

When the back switching instruction has not been obtained (S39: No), the CPU 11 determines whether the side switching instruction has been obtained (S45). As illustrated in FIG. 10, suppose that the first side image is displayed in the display area R. In this case, the side button 21 is grayed-out. Therefore, at least, the side switching instruction is not obtained. In FIG. 10, a halftone dot patterning given in the side button 21 indicates that the side button 21 is in a grayed-out state.

When the side switching instruction has been obtained (S45: Yes), the CPU 11 controls the transmission of the side switching instruction (S47). The CPU 11 outputs a transmission command for the side switching instruction to the communication unit 16. In association with this, the communication unit 16 transmits the side switching instruction to the image processing device 30. Subsequently, the CPU 11 controls the display of the first side image (S49). The CPU 11 creates the first side image from the first side data stored in the RAM 13. Subsequently, the CPU 11 outputs, to the display unit 15, a display command that switches the display in the display area R on the confirmation screen to the first side image. In association with this, the display unit 15 displays the first side image in the display area R (see FIG. 10). The side button 21 is grayed out. After the execution of S49, the CPU 11 returns the process to S33. Afterwards, the CPU 11 repeatedly executes the process at S33 and the processes after S33.

When the side switching instruction has not been obtained (S45: No), the CPU 11 transitions the process to S51 in FIG. 4. At S51, the CPU 11 determines whether the reselection instruction has been obtained. When the reselection instruction has been obtained (S51: Yes), the CPU 11 controls the transmission of the reselection instruction (S53). The CPU 11 outputs a transmission command for the reselection instruction to the communication unit 16. In association with this, the communication unit 16 transmits the reselection instruction to the image processing device 30. After the execution of S53, the CPU 11 returns the process to S17 in FIG. 2. Afterwards, the CPU 11 repeatedly executes the process at S17 and processes after S17.

When the reselection instruction has not been obtained (S51: No), the CPU 11 determines whether the confirmation instruction has been obtained (S55). When the confirmation instruction has been obtained (S55: Yes), the CPU 11 controls the transmission of the confirmation instruction (S57). The CPU 11 outputs a transmission command for the confirmation instruction to the communication unit 16. In association with this, the communication unit 16 transmits the confirmation instruction to the image processing device 30. Afterwards, the CPU 11 ends the acceptance process. Note that after the confirmation instruction has been obtained (see S55: Yes) and the confirmation instruction has been transmitted at S57, the CPU 11 may also return the process to S17 in FIG. 2. Such process procedure can newly design clothes with a different shape. For example, clothes that can be worn as a set with previously confirmed clothes can be newly designed.

When the confirmation instruction has not been obtained (S55: No), the CPU 11 determines whether the end instruction has been obtained (S59). When the end instruction has not been obtained (S59: No), the CPU 11 returns the process to S33 in FIG. 3. Afterwards, the CPU 11 repeatedly executes the process at S33 and the processes after S33. When the end instruction has been obtained (S59: Yes), the CPU 11 ends the acceptance process, <Output Process>

The output process executed by the image processing device 30 is described with reference to FIGS. 11 to 17, The "vertical direction" illustrated in FIG. 14 clearly specifies a correspondence relationship with FIG. 6. The "vertical direction" illustrated in FIGS. 15 to 17 clearly specifies a correspondence to the longitudinal direction of the display device 40. As mentioned above, the display device 40 is installed such that the longitudinal direction of the display device 40 becomes the vertical direction. For example, the above-mentioned shop assistant of the business operator inputs a start instruction for the output process to the operating device 60 before or after the input of the start instruction to the terminal 10. The input start instruction is accepted by the operating device 60 and is input to the image processing device 30. The CPU 31 obtains the start instruction from the operating device 60 via the input unit 36. In response to the acquisition of the start instruction, the CPU 31 starts the program for the output process stored in the storage device 32. In association with this, the output process starts.

The CPU 31 that has started the output process obtains the shot data (S71). For example, the shop assistant instructs the wearer to stand before the shooting device 50 in a state of facing the front with respect to the shooting device 50. The shooting device 50 shoots the front of the wearer. The shooting device 50 outputs a shot data corresponding to a shot image including the front of the wearer. Next, the shop assistant instructs the wearer to stand before the shooting device 50 in a state of facing the back with respect to the shooting device 50. The shooting device 50 shoots the back of the wearer. The shooting device 50 outputs a shot data corresponding to a shot image including the back of the wearer. Finally, the shop assistant instructs the wearer to stand before the shooting device 50 in a state of facing the side with respect to the shooting device 50. The shooting device 50 shoots the side of the wearer. The shooting device 50 outputs a shot data corresponding to a shot image including the side of the wearer. The CPU 31 obtains the respective front, back, and side shot data output from the shooting device 50 via the input unit 36. The obtained respective front, back, and side shot data are stored in the RAM 33.

Next, the CPU 31 determines whether the figure information has been obtained (S73). The terminal 10 transmits the figure information at S15 in FIG. 2. In the image processing device 30, the communication unit 34 receives the figure information. The CPU 31 obtains the figure information via the communication unit 34. The obtained figure information is stored in the RAM 33. When the figure information has not been obtained (S73: No), the CPU 31 repeatedly executes this determination. When the figure information has been obtained (S73: Yes), the CPU 31 obtains the doll data associated with the obtained figure information from the storage device 32 (S75). The obtained doll data is stored in the RAM 33. For example, suppose that the figure information M has been obtained as the figure information. In this case, the CPU 31 obtains the front doll data M, the back doll data M, and the side doll data M associated with the figure information M from the storage device 32. The obtained respective front, back, and side doll data M are stored in the RAM 33.

After the execution of S75, the CPU 31 determines whether the clothing information has been obtained (S77). The terminal 10 transmits the clothing information at S21 in FIG. 2. In the image processing device 30, the communication unit 34 receives the clothing information. The CPU 31 obtains the clothing information via the communication unit 34. The obtained clothing information is stored in the RAM 33. When the clothing information has not been obtained (S77: No), the CPU 31 repeatedly executes this determination. When the clothing information has been obtained (S77: Yes), the CPU 31 obtains the clothing data associated with the obtained clothing information from the storage device 32 (S79). The obtained clothing data is stored in the RAM 33. For example, suppose that the clothing information A3 has been obtained as the clothing information. In this case, the CPU 31 obtains the front clothing data A3, the back clothing data A3, and the side clothing data A3 associated with the clothing information A3 from the storage device 32. The obtained respective front, back, and side clothing data A3 are stored in the RAM 33.

After the execution of S79, the CPU 31 determines whether the pattern information has been obtained (S81). The terminal 10 transmits the pattern information at S27 in FIG. 2. In the image processing device 30, the communication unit 34 receives the pattern information. The CPU 31 obtains the pattern information via the communication unit 34. The obtained pattern information is stored in the RAM 33. When the pattern information has not been obtained (S81: No), the CPU 31 repeatedly executes this determination. When the pattern information has been obtained (S81: Yes), the CPU 31 obtains the pattern data associated with the obtained pattern information from the storage device 32 (S83). The obtained pattern data is stored in the RAM 33. For example, suppose that the pattern information B1 has been obtained as the pattern information. In this case, the CPU 31 obtains the pattern data. B1 associated with the pattern information B1 from the storage device 32. The obtained pattern data B1 is stored in the RAM 33.

After the execution of S83, the CPU 31 combines the clothing data and the pattern data to create intermediate data (S85). For example, suppose that the respective front, back, and side clothing data A3 are obtained and stored in the RAM 33 at S79. Suppose that the pattern data B1 has been obtained and stored in the RAM 33 at S83. In this case, the CPU 31 combines the front clothing data A3 and the pattern data B1 to create front intermediate data. The front intermediate data is composite data corresponding to the composite image illustrated as "front" in FIG. 14. The CPU 31 combines the back clothing data A3 and the pattern data B1 to create back intermediate data. The back intermediate data is composite data corresponding to the composite image illustrated as "back" in FIG. 14. The CPU 31 combines the side clothing data A3 and the pattern data B1 to create side intermediate data. The side intermediate data is composite data corresponding to the composite image illustrated as "side" in FIG. 14. At S85, a known composition process technique is employed. Therefore, descriptions regarding the composition process executed at S85 are omitted. The respective front, back, and side clothing data (see S79) and the pattern data (see S83) are deleted from the RAM 33. The created respective front, back, and side intermediate data are store in the RAM 33.

Next, the CPU 31 starts the first composition process (S87). The first composition process creates the first composite data and transmits the first composite data to the terminal 10. The first composite data created by the first composition process is first front data, first back data, and first side data. The first composition process will be described below. Subsequently, the CPU 31 starts the second composition process (S89). The second composition process creates the second composite data and stores the second composite data in the RAM 33. The second composite data created by the second composition process is second front data, second back data, and second side data. In the embodiment, the second composite data is a name of the composite data used when the second front data, the second back data, and the second side data are not discriminated or these are collectively referred to. The second front data is a composite image corresponding to the second front image. The second back data is a composite image corresponding to the second back image. The second side data is a composite image corresponding to the second side image.

Figure 11:
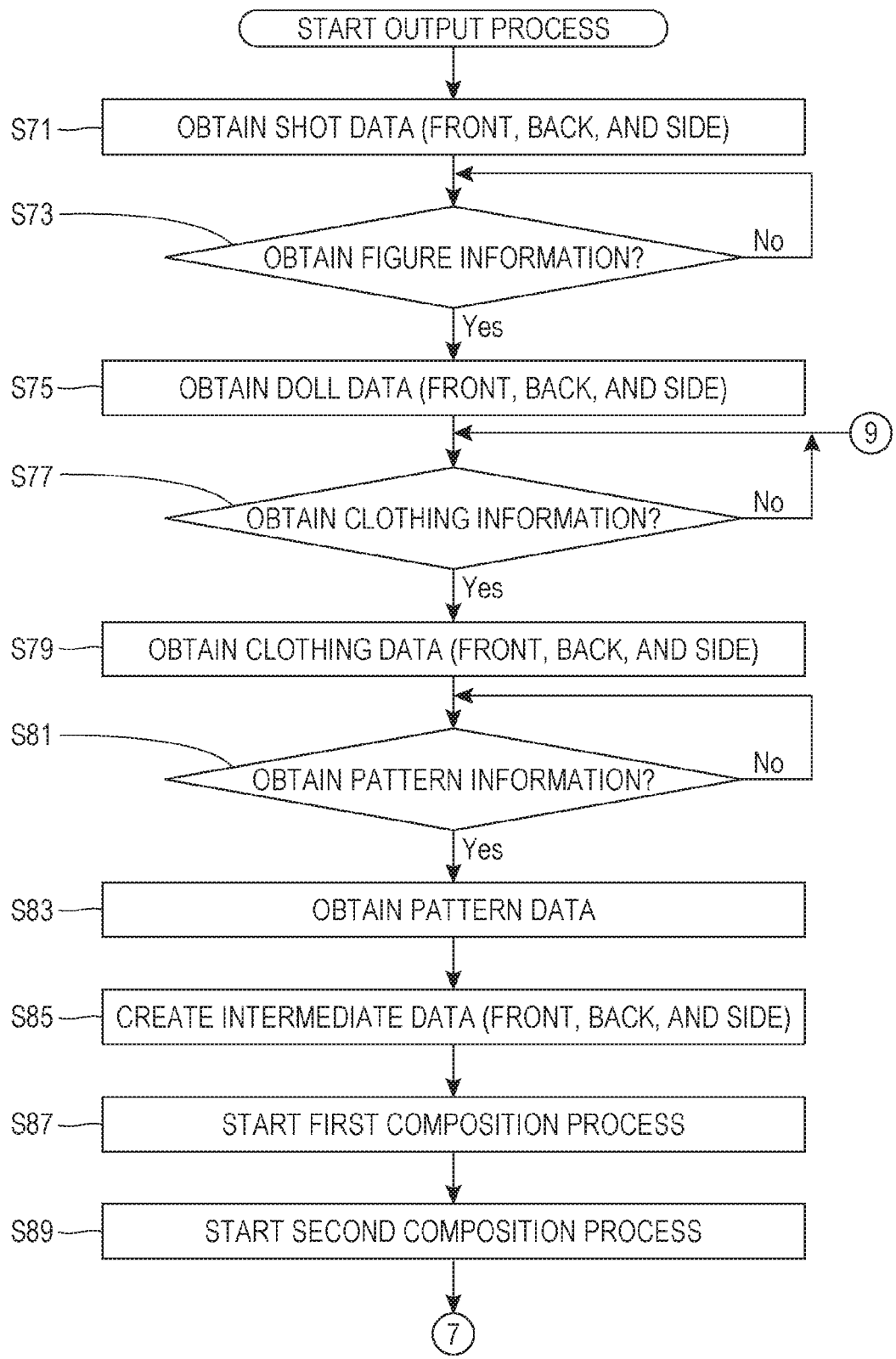
FIG. 11 is a flowchart for a first part of an output process.

The second front image is a composite image corresponding to a front of the following doll who wears clothes with pattern corresponding to the front intermediate data created at S85 in FIG. 11 and has a head image of the wearer as an image of the head. The previously mentioned doll is a doll with the predetermined figure corresponding to the front doll data stored in the RAM 33 at S75. In the second front image, the head image of the wearer is a front head image. The second back image is composite image corresponding to a back of the following doll who wears clothes with pattern corresponding to the back intermediate data created at S85 in FIG. 11 and has a head image of the wearer as an image of the head. The previously mentioned doll is a doll with the predetermined figure corresponding to the back doll data stored in the RAM 33 at S75. In the second back image, the head image of the wearer is a back head image. The second side image is composite image corresponding to a side of the following doll who wears clothes with pattern corresponding to the side intermediate data created at S85 in FIG. 11 and has a head image of the wearer as an image of the head. The previously mentioned doll is a doll with the predetermined figure corresponding to the side doll data stored in the RAM 33 at S75. The side of the doll is the side on the side identical to the side of the wearer shot by the shooting device 50. In the embodiment, the shot target by the shooting device 50 is the right side of the wearer. Therefore, the second side image is a composite image corresponding to the right side of the doll. In the second side image, the head image of the wearer is a side head image. In the embodiment, when the second front image, the second back image, and the second side image are not discriminated or these are collectively referred to, these are referred to as a "second composite image." It can also be said that the second composite data is composite data corresponding to the second composite image. The second composition process and the respective front, back, and side head images will be described below. After the execution of S89, the CPU 31 transitions the process to S91 in FIG. 12.

At S91, the CPU 31 determines whether both the first composition process started at S87 and the second composition process started at S89 end. The end of the first composition process is determined by, for example, ON or OFF of a first composite flag. The CPU 31 turns ON the first composite flag at S87 and turns OFF the first composite flag in association with the end of the first composition process. The end of the second composition process is determined by, for example, ON or OFF of a second composite flag. The CPU 31 turns ON the second composite flag at S89 and turns OFF the second composite flag in association with the end of the second composition process. Suppose that the at least any one of the first composite flag and the second composite flag is ON. In this case, at least any one of the first composition process and the second composition process is in execution, and S91 is denied. When S91 is denied (S91: No), the CPU 31 repeatedly executes this determination.

In contrast to this, suppose that both the first composite flag and the second composite flag are OFF. In this case, both the first composition process and the second composition process are ended, and S91 is affirmed. When S91 is affirmed (S91: Yes), the CPU 31 controls the output of the second composite image (S93). The initial output target in the output of the second composite image is made the second front image. The CPU 31 creates the second front image from the second front data stored in the RAM 33 at S135 in FIG. 19 described below. Subsequently, the CPU 31 outputs an output command for the second front image to the output unit 35. In association with this, the output unit 35 outputs the output command for the second front image to the display device 40. The display device 40 displays the second front image (see FIG. 15).

After the execution of S93, the CPU 31 determines whether the front switching instruction has been obtained (S95). The terminal 10 transmits the front switching instruction at S35 in FIG. 3. In the image processing device 30, the communication unit 34 receives the front switching instruction. The CPU 31 obtains the front switching instruction via the communication unit 34. Suppose that the terminal 10 displays the confirmation screen including the first front image in the display unit 15 (see FIG. 8). In this case, as mentioned above, S33 is denied (see S33: No in FIG. 3), and S35 in FIG. 3 is not executed. Accordingly, in the image processing device 30, the communication unit 34 does not receive the front switching instruction, and the CPU 31 does not obtain this instruction. For example, similar to the case where S33 in FIG. 3 is executed immediately after S31, when S95 is executed immediately after S93, S95 is not affirmed (S95: Yes) but is denied (S95: No).

When the front switching instruction has been obtained (S95: Yes), the CPU 31 controls the output of the second front image (S97). The CPU 31 creates the second front image from the second front data stored in the RAM 33 at S135 in FIG. 19 described below. Subsequently, the CPU 31 outputs the output command for the second front image to the output unit 35. In association with this, the output unit 35 outputs the output command for the second front image to the display device 40. The display device 40 displays the second front image (see FIG. 15). After the execution of S97, the CPU 31 returns the process to S95. Afterwards, the CPU 31 repeatedly executes the process at S95 and processes after S95.

When the front switching instruction has not been obtained (S95: No), the CPU 31 determines whether the back switching instruction has been obtained (S99). The terminal 10 transmits the back switching instruction at S41 in FIG. 3. In the image processing device 30, the communication unit 34 receives the back switching instruction. The CPU 31 obtains the back switching instruction via the communication unit 34. Suppose that the terminal 10 displays the confirmation screen including the first back image in the display unit 15 (see FIG. 9). In this case, as mentioned above, S39 is denied (see S39: No in FIG. 3), and S41 in FIG. 3 is not executed. Accordingly, in the image processing device 30, the communication unit 34 does not receive the back switching instruction, and the CPU 31 does not obtain this instruction.

When the back switching instruction has been obtained (S99: Yes), the CPU 31 controls the output of the second back image (S101). The CPU 31 creates the second back image from the second back data stored in the RAM 33 at S135 in FIG. 19 described below Subsequently, the CPU 31 outputs an output command for the second back image to the output unit 35. In association with this, the output unit 35 outputs the output command for the second back image to the display device 40. The display device 40 displays the second back image (see FIG. 16). After the execution of S101, the CPU 31 returns the process to S95. Afterwards, the CPU 31 repeatedly executes the process at S95 and the processes after S95.

When the back switching instruction has not been obtained (S99: No), the CPU 31 determines whether the side switching instruction has been obtained (S103). The terminal 10 transmits the side switching instruction at S47 in FIG. 3. In the image processing device 30, the communication unit 34 receives the side switching instruction. The CPU 31 obtains the side switching instruction via the communication unit 34. Suppose that the terminal 10 displays the confirmation screen including the first side image in the display unit 15 (see FIG. 10). In this case, as mentioned above, S45 is denied (see S45: No in FIG. 3), and S47 in FIG. 3 is not executed. Accordingly, in the image processing device 30, the communication unit 34 does not receive the side switching instruction, and the CPU 31 does not obtain this instruction.

When the side switching instruction has been obtained (S103: Yes), the CPU 31 controls the output of the second side image (S105). The CPU 31 creates the second side image from the second side data stored in the RAM 33 at S135 in FIG. 19 described below. Subsequently, the CPU 31 outputs an output command for the second side image to the output unit 35. In association with this, the output unit 35 outputs the output command for the second side image to the display device 40. The display device 40 displays the second side image (see FIG. 17). After the execution of S105, the CPU 31 returns the process to S95. Afterwards, the CPU 31 repeatedly executes the process at S95 and the processes after S95.

When the side switching instruction has not been obtained (S103: No), the CPU 31 determines whether the reselection instruction has been obtained (S107). The terminal 10 transmits the reselection instruction at S53 in FIG. 4. In the image processing device 30, the communication unit 34 receives the reselection instruction. The CPU 31 obtains the reselection instruction via the communication unit 34. When the reselection instruction has been obtained (S107: Yes), the CPU 31 returns the process to S77 in FIG. 11. Then, the clothing information (see S77: Yes in FIG. 11), the pattern information (see S81: Yes in FIG. 11), and the respective front, back, and side intermediate data (see S85 in FIG. 11) stored in the RAM 33 are deleted from the RAM 33. Afterwards, the CPU 31 repeatedly executes the process at S77 and the processes after S77. In this case, the CPU 31 does not control the output of the output command to the display device 40. Therefore, the display device 40 continues displaying the second composite image in display. When the wearer reselects the shape and the pattern of the clothes, the wearer can select one or both of a shape and a pattern of new clothes while confirming the second composite image displayed in the display device 40.

When the reselection instruction has not been obtained (S107: No), the CPU 31 transitions the process to S109 in FIG. 13. At S109, the CPU 31 determines whether the confirmation instruction has been obtained. The terminal 10 transmits the confirmation instruction at S57 in FIG. 4. In the image processing device 30, the communication unit 34 receives the confirmation instruction. The CPU 31 obtains the confirmation instruction via the communication unit 34.

When the confirmation instruction has been obtained (S109: Yes), the CPU 31 stores confirmation information in the storage device 32 (S111). The confirmation information includes the figure information (see S73: Yes in FIG. 11), the clothing information (see S77: Yes in FIG. 11), and the pattern information (see S81: Yes in FIG. 11) stored in the RAM 33 at a timing of the acquisition of the confirmation instruction. The confirmation information is associated with the information to identify the wearer. The clothes designed in the clothing design display system 1 are produced by a known method in accordance with the confirmation information.

Figure 15:
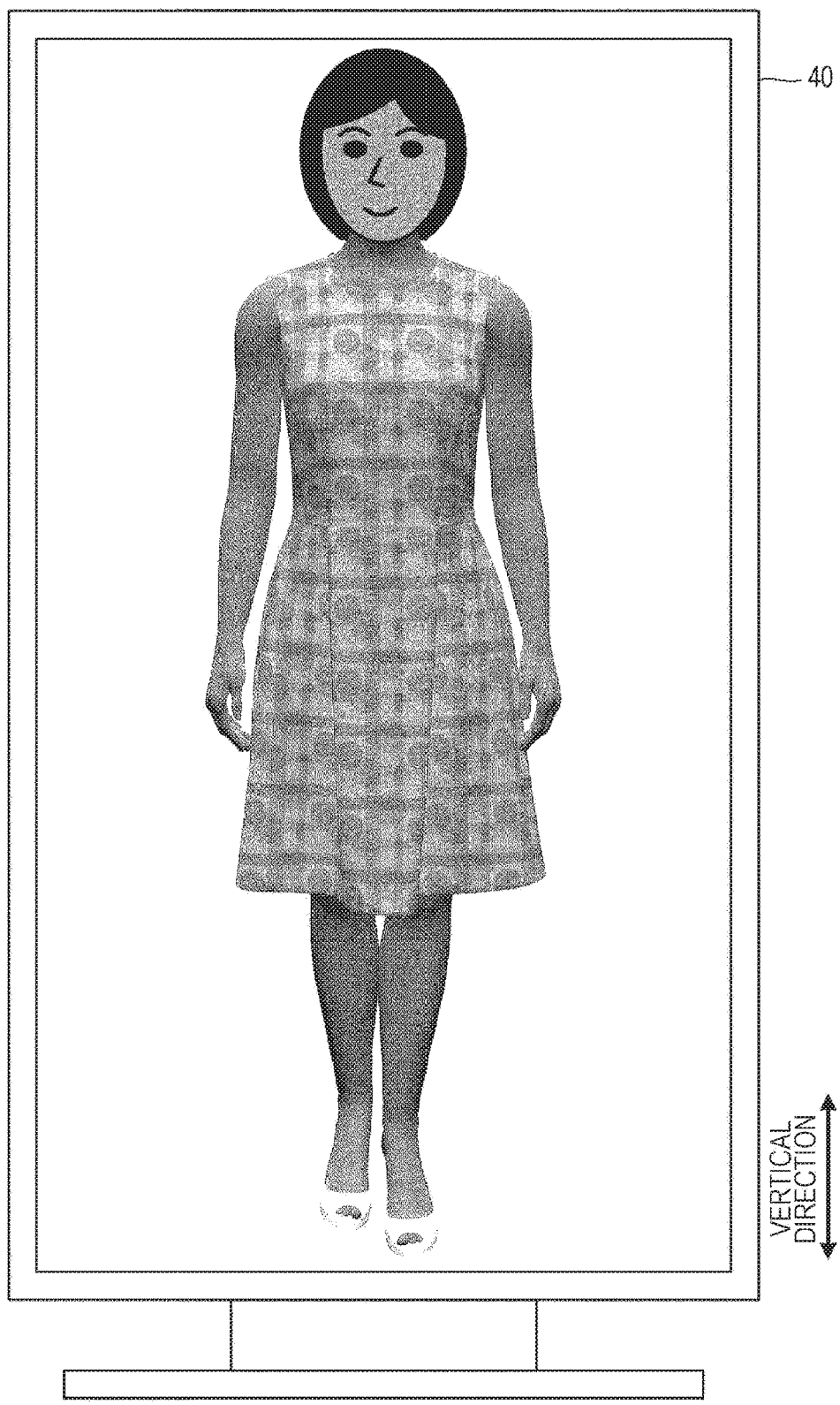
FIG. 15 is a drawing illustrating one example of a state in which a display device displays a second front image.

For example, suppose that the confirmation instruction obtained this time is a confirmation instruction transmitted from the terminal 10 based on the execution of the tap operation to the operating unit 14 on the confirm button 23 with the display states of the respective display unit 15 and display device 40 being the following states. The previously mentioned states are, for example, the states in which the display unit 15 displays the confirmation screen including the first front image illustrated in FIG. 8 and further the display device 40 displays the second front image illustrated in FIG. 15. Suppose that the first front image and the second front image are based on the figure information M. In this case, the RAM 33 stores the figure information M, the clothing information A3, and the pattern information B1. Therefore, the CPU 31 associates the confirmation information including the figure information M, the clothing information A3, and the pattern information B1 with the information to identify the wearer and stores the confirmation information in the storage device 32. Afterwards, the clothes in the state illustrated in FIGS. 8 and 15 are produced based on this confirmation information.

The clothing production apparatus 81, which constitutes the clothing production system 80 together with the clothing design display system 1, produces the clothes. That is, the clothing production apparatus 81 produces clothes in the first composite image and the second composite image. The clothing production apparatus 81, for example, includes a printing device 82, a cutting device 83, and a sewing device 84 (see FIG. 1). The printing device 82 prints a pattern corresponding to the pattern information in the confirmation information to a predetermined fabric. As the printing device 82, an inkjet printer is exemplified. The cutting device 83 cuts the fabric, on which the previously mentioned pattern has been printed, into respective parts corresponding to the clothes in accordance with the figure information and the clothing information in the confirmation information. Afterwards, the sewing device 84 sews the respective cut parts. Known printing device, cutting device, and sewing device can be employed as the printing device 82, the cutting device 83, and the sewing device 84, which are included in the clothing production apparatus 81. Therefore, other descriptions regarding the clothing production apparatus 81, the printing device 82, the cutting device 83, and the sewing device 84 are omitted. After the execution of S111, the CPU 31 ends the output process. Note that as mentioned above, when the process procedure in the acceptance process illustrated in FIGS. 2 to 4 is configured such that the process returns to S17 in FIG. 2 after the execution of S57 in FIG. 4, after the CPU 31 executes S111, the CPU 31 returns the process to S77 in FIG. 11.

When the confirmation instruction has not been obtained (S109: No), the CPU 31 determines whether the end instruction has been obtained (S113). The terminal 10 transmits the end instruction at S61 in FIG. 4. In the image processing device 30, the communication unit 34 receives the end instruction. The CPU 31 obtains the end instruction via the communication unit 34. When the end instruction has not been obtained (S113: No), the CPU 31 returns the process to S95 in FIG. 12. Afterwards, the CPU 31 repeatedly executes the process at S95 and the processes after S95. When the end instruction has been obtained. (S113: Yes), the CPU 31 ends the output process.

<First Composition Process>

Figure 12:
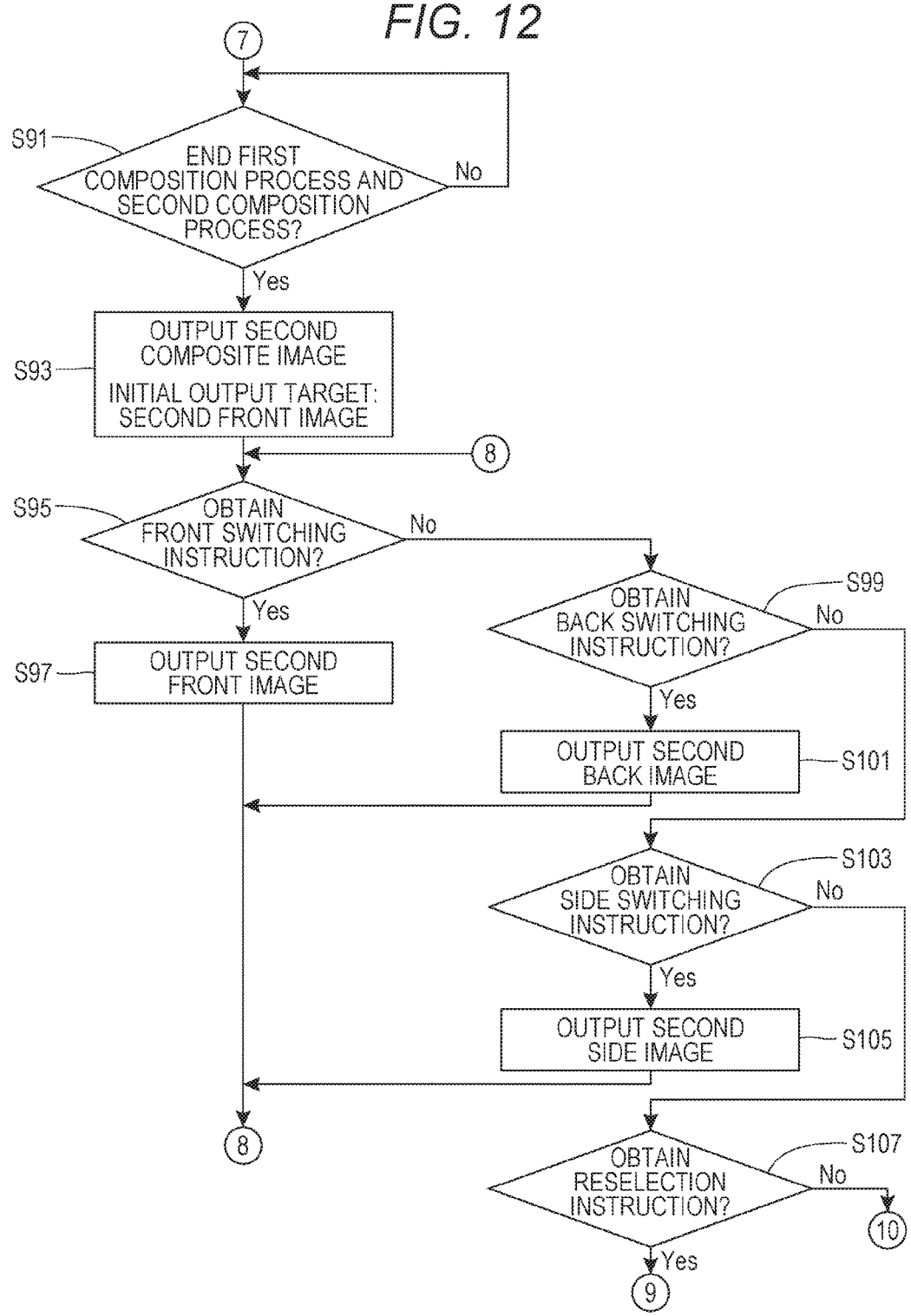
FIG. 12 is a flowchart for a second part of the output process.
Figure 13:
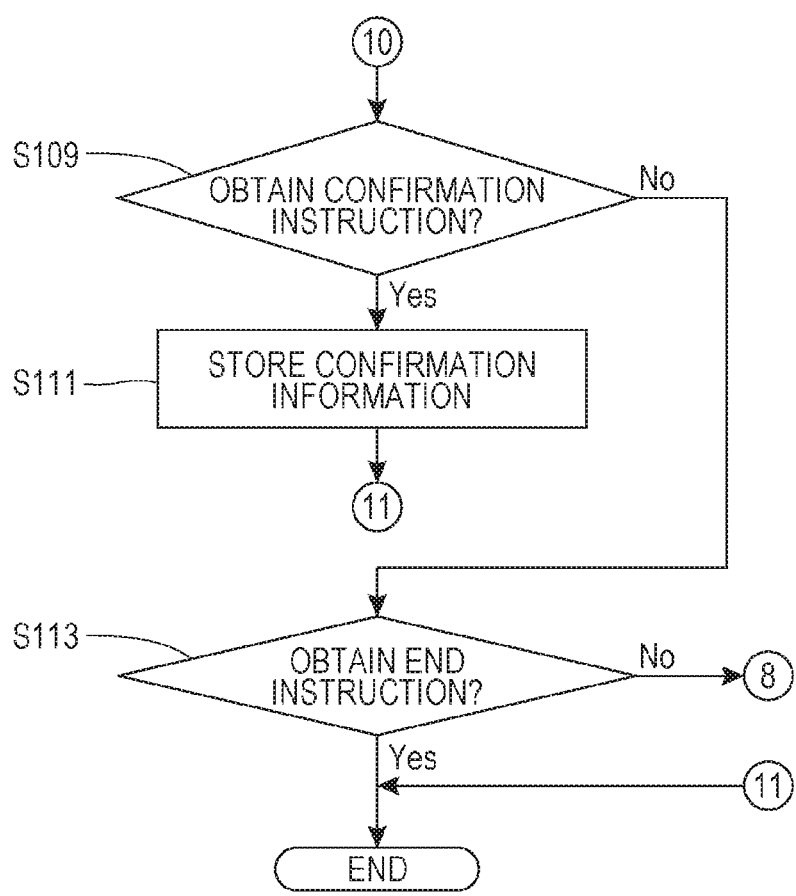
FIG. 13 is a flowchart for a third part of the output process.
Figure 14:
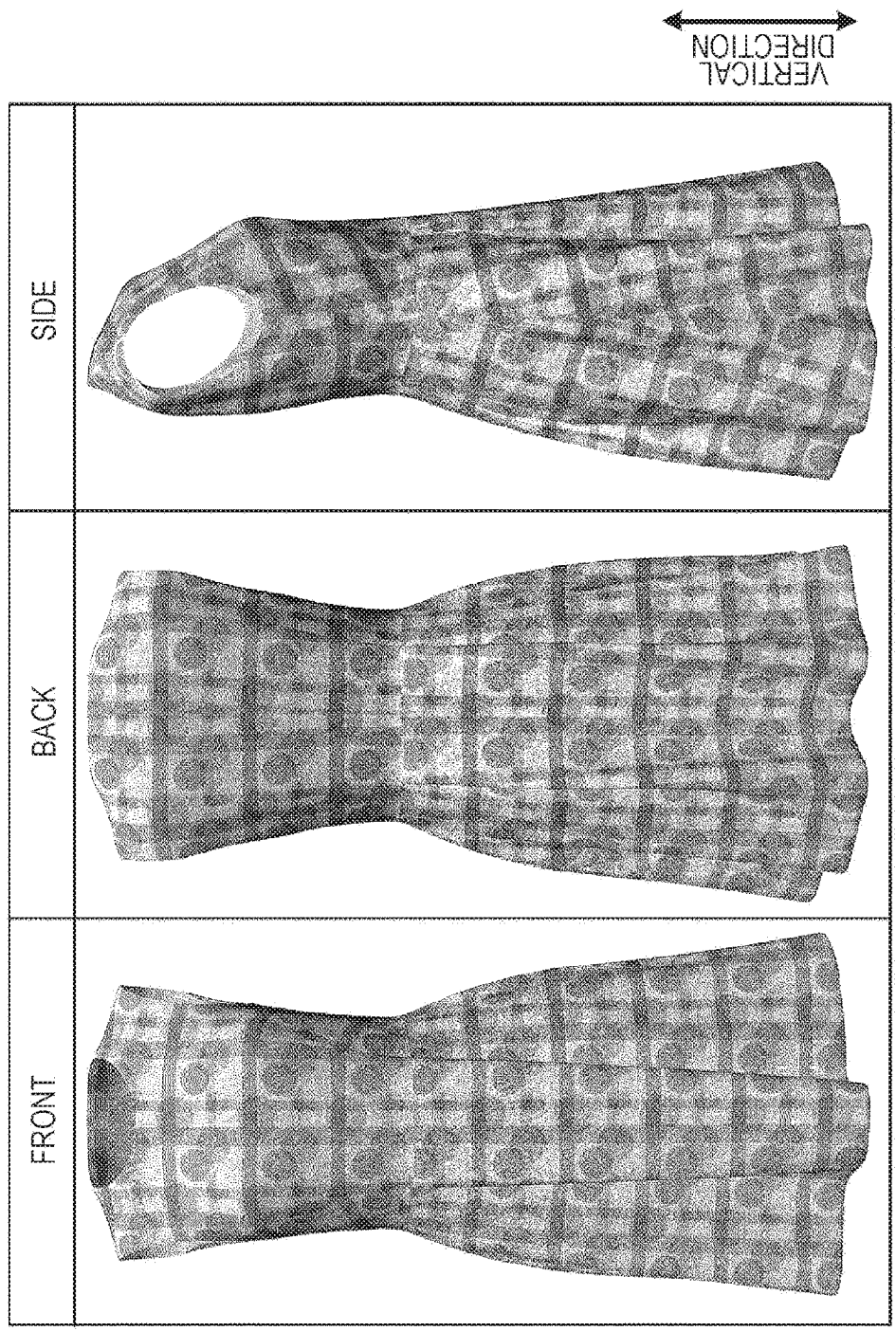
FIG. 14 is a drawing illustrating a composite image corresponding to intermediate data obtained by combining clothing data and pattern data.
Figure 18:
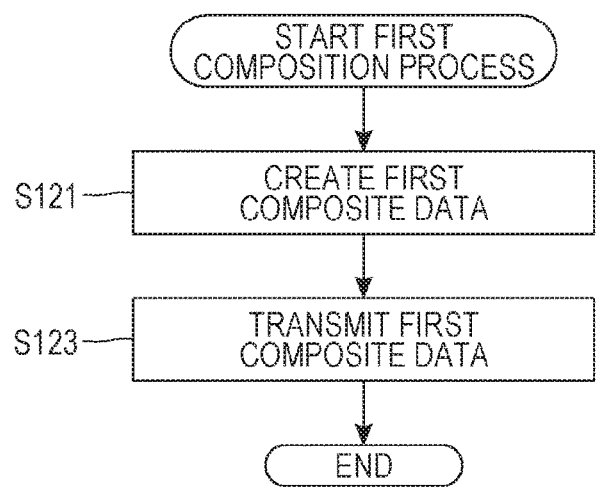
FIG. 18 is a flowchart for a first composition process.

The first composition process started at S87 (see FIG. 11) in the output process illustrated in FIGS. 11 to 13 is described with reference to FIG. 18. The CPU 31 that has started the first composition process creates the first composite data (S121). For example, suppose that, at S75 in FIG. 11, the front doll data M, the back doll data M, and the side doll data M are obtained and are stored in the RAM 33. Suppose that, at S85 in FIG. 11, the front intermediate data corresponding to the composite image illustrated as "front" in FIG. 14, the back intermediate data corresponding to the composite image illustrated as "back" in FIG. 14, and the side intermediate data corresponding to the composite image illustrated as "side" in FIG. 14 are created and stored in the RAM 33.

In this case, the CPU 31 combines the front doll data M and the above-mentioned front intermediate data to create the first front data corresponding to the first front image illustrated in FIG. 8. The CPU 31 combines the back doll data M and the above-mentioned back intermediate data to create the first back data corresponding to the first back image illustrated in FIG. 9. The CPU 31 combines the side doll data M and the above-mentioned side intermediate data to create the first side data corresponding to the first side image illustrated in FIG. 10. The created first front data, first back data, and first side data are stored in the RAM 33. The known composition process technique is employed at S121. Therefore, descriptions regarding the composition process executed at S121 are omitted.

Next, the CPU 31 controls the transmission of the first composite data created at S121 (S123). The CPU 31 outputs a transmission command for the first composite data to the communication unit 34. In association with this, the communication unit 34 transmits the first composite data to the terminal 10. That is, at S123, the CPU 31 outputs the transmission commands for the first front data, first back data, and first side data to the communication unit 34. In association with this, the communication unit 34 transmits the first front data, the first back data, and the first side data to the terminal 10. Afterwards, the CPU 31 ends the first composition process.

<Second Composition Process>

The second composition process started at S89 (see FIG. 11) in the output process illustrated in FIGS. 11 to 13 is described with reference to FIG. 19. The CPU 31 that has stated the second composition process extracts head data from the shot data (S131). The shot data to be the process target is the respective front, back, and side shot data stored in the RAM 33 at S71 in FIG. 11. The CPU 31 executes image analysis on the front shot data to detect a head image of the head of the wearer. The CPU 31 extracts, from the front shot data, the head data, which corresponds to the detected head image, and stores the head data in the RAM 33. The CPU 31 executes image analysis on the back shot data to detect a head image of the head of the wearer. The CPU 31 extracts, from the back shot data, the head data, which corresponds to the detected head image, and stores the head data in the RAM 33. The CPU 31 executes image analysis on the side shot data to detect a head image of the head of the wearer. The CPU 31 extracts, from the side shot data, the head data, which corresponds to the detected head image, and stores the head data in the RAM 33. At S131, for example, to detect the head image, a contour of the head of the wearer is detected by a known edge detection process technique. That is, at S131, a known image analysis technique is employed. Therefore, descriptions regarding the image analysis technique executed at S131 are omitted.

In the embodiment, the head data extracted from the front shot data is referred to as "front head data," and the head image corresponding to the front head data is referred to as a "front head image," and the head data extracted from the back shot data is referred to as "back head data." The head image corresponding to the back head data is referred to as a "back head image." The head data extracted from the side shot data is referred to as "side head data." The head image corresponding to the side head data is referred to a "side head image." When the respective front, back, and side head data are not discriminated or these are collectively referred to, these are referred to as "head data." When the respective front, back, and side head images are not discriminated or these are collectively referred to, these are referred to as a "head image."

Next, the CPU 31 specifies color information of a skin of the wearer included in the head image from the head data (S133). The head data to be the process target is a part of or all of the respective front, back, and side head data stored in the RAM 33. For example, the front head data or the respective front and side head data is to be the process target. The color information is specified targeting a predetermined region in the head image. For example, the color information is specified targeting a face or a specific region on the face. As the specific region on the face, a cheek is exemplified. To specify the color of the skin, the CPU 31 executes the image analysis on the head data to detect the region to be the specification target. Subsequently, the CPU 31 specifies the color information of the skin from the color information at the detected region. When the specification target for the color information is plural, an average value of the color information specified from the respective regions may also be specified as the color information of the skin. For example, suppose that the color information is specified by an RGB value, in this case, the average value of the color information is obtained by, for example, averaging the respective R value, G value, and B value at each region. Besides, the color information may also be individually specified from the respective front, back, and side head data. Regarding the specification of the color information from the back head data, for example, when an ear is included in the back head image, the color information is specified using the ear as the specification target. The specified color information is stored in the RAM 33.

After the execution of S133, the CPU 31 creates the second composite data (S135). The created second composite data is stored in the RAM 33. For example, suppose that the front doll data M, the back doll data M, and, the side doll data M are obtained and stored in the RAM 33 at S75 in FIG. 11. Suppose that the front intermediate data corresponding to the composite image illustrated as "front" in FIG. 14, the back intermediate data corresponding to the composite image illustrated as "back" in FIG. 14, and the side intermediate data corresponding to the composite image illustrated as "side" in FIG. 14 are created and are stored in the RAM 33 at S85 in FIG. 11.

Figure 16:
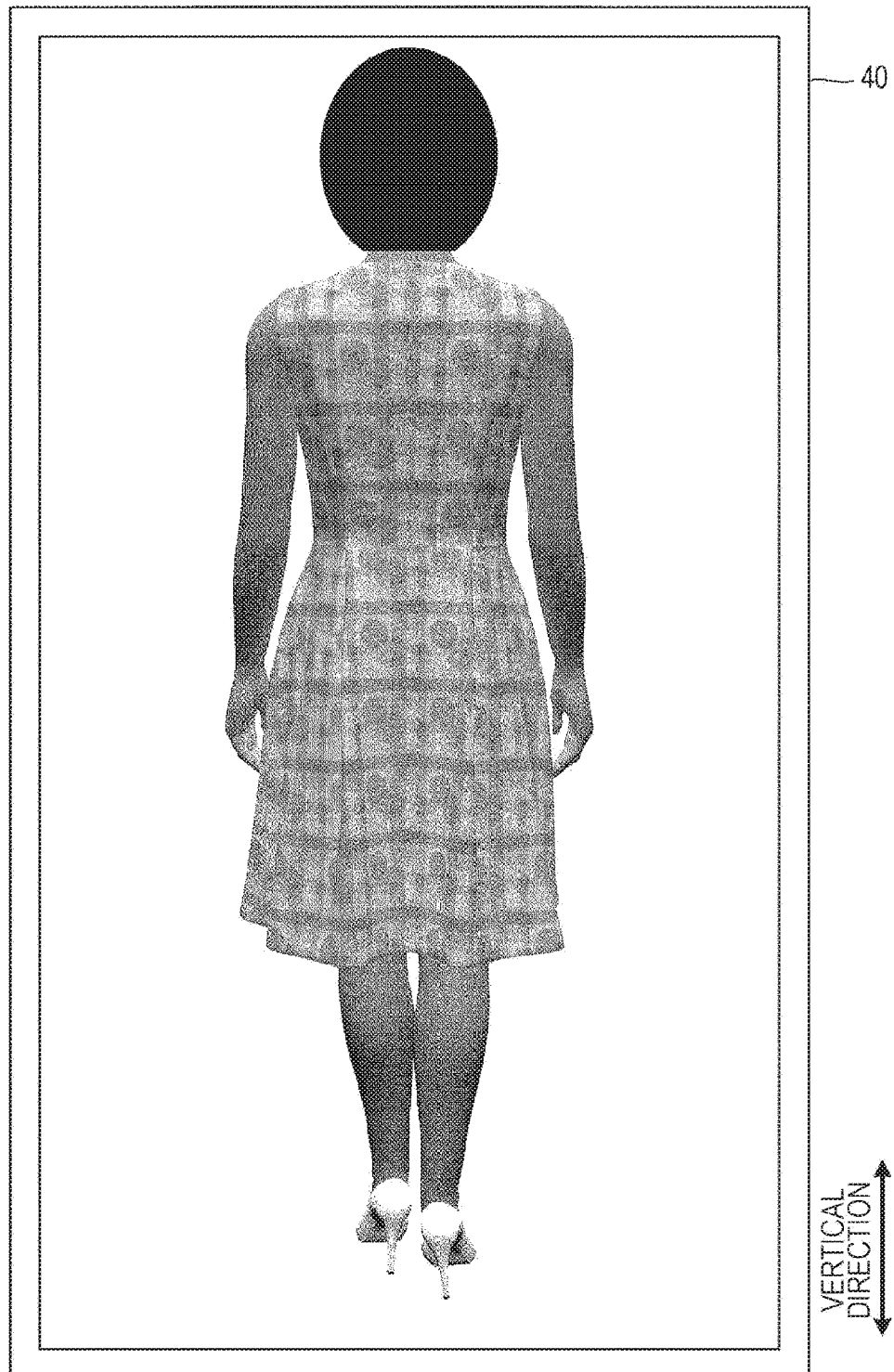
FIG. 16 is a drawing illustrating one example of a state in which the display device displays a second back image.
Figure 17:
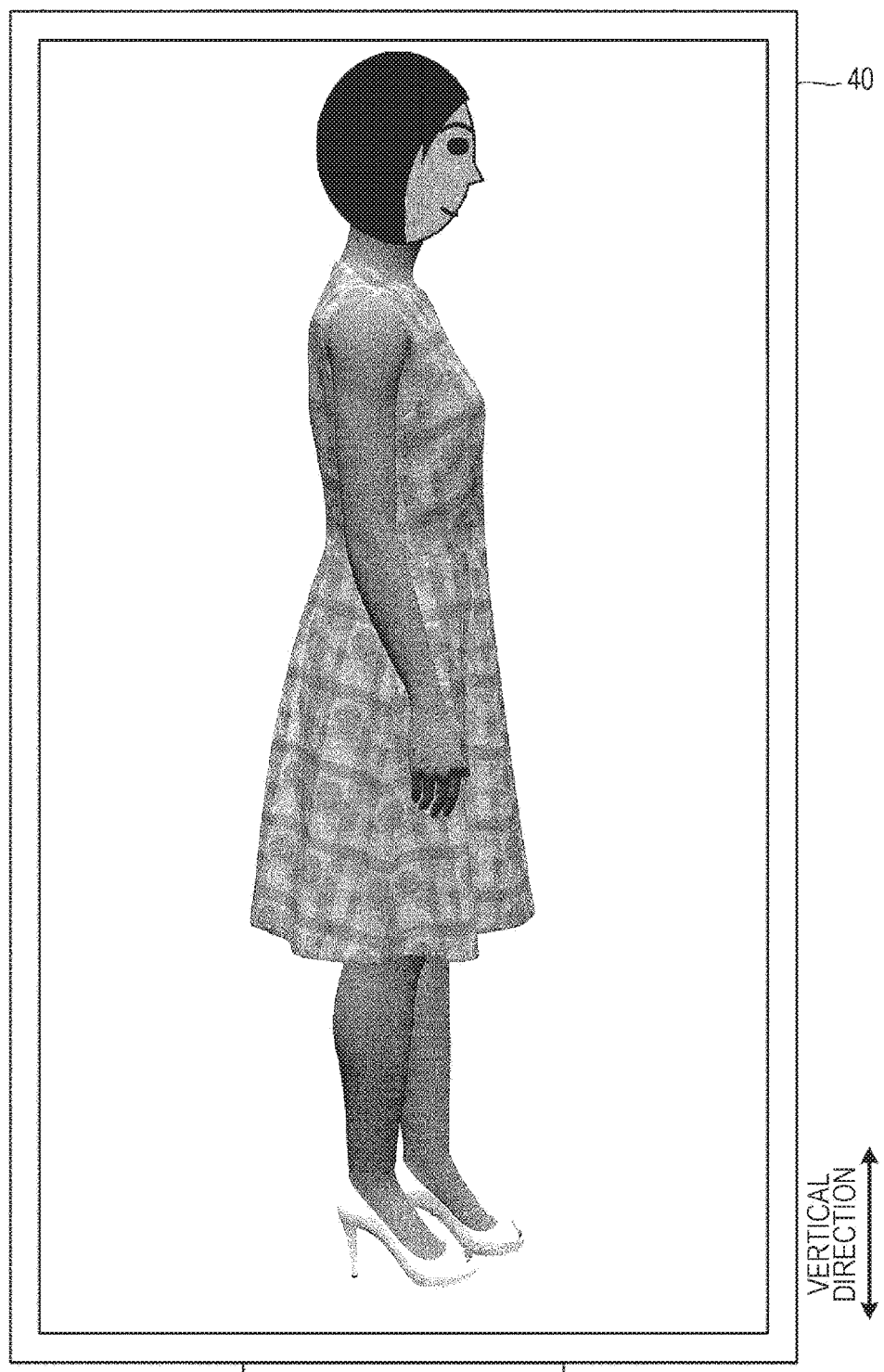
FIG. 17 is a drawing illustrating one example of a state in which the display device displays a second side image.

In this case, the CPU 31 combines the front doll data M, the above-mentioned front intermediate data, and the front head data. Then, the CPU 31 sets the head as the front head image corresponding to the front head data. Additionally, the CPU 31 sets a part of the doll excluding the head not covered with the worn clothes as the color of the color information stored in the RAM 33. That is, the CPU 31 creates the second front data corresponding to the second front image illustrated in FIG. 15. The CPU 31 combines the back doll data M, the above-mentioned back intermediate data, and the back head data. Then, the CPU 31 sets the head as the back head image corresponding to the back head data. Additionally, the CPU 31 sets the part of the doll excluding the head not covered with the worn clothes as a color of the color information stored in the RAM 33. That is, the CPU 31 creates the second back data corresponding to the second back image illustrated in FIG. 16. The CPU 31 combines the side doll data M, the above-mentioned side intermediate data, and the side head data. Then, the CPU 31 sets the head as the side head image corresponding to the side head data. Additionally, the CPU 31 sets the part of the doll excluding the head not covered with the worn clothes as the color of the color information stored in the RAM 33. That is, the CPU 31 creates the second side data corresponding to the second side image illustrated in FIG. 17. The created second front data, second back data, and second side data are stored in the RAM 33. FIGS. 15 to 17 are drawings assisting understanding of the explanation on the embodiments including S135. Therefore, FIGS. 15 to 17 do not take the accurate identity between the color of the color information stored in the RAM 33 and the color at the part of the doll excluding the head not covered with the worn clothes into consideration.

Suppose that the color information has been specified regarding the respective front, back, and side. In this case, the front color information is used to combine the second front data. The back color information is used to combine the second back data. When the back color information is not specified, front or side color information or an average value of respective front and side color information is used. The side color information is used to combine the second side data. Prior to the combination of the doll data, the intermediate data, and the shot data, the doll data may also be made to have a color of the color information stored in the RAM 33. In this case, the above-mentioned composition process is executed using the doll data made to have a color of the color information stored in the RAM 33. In this case, also, the second composite data corresponding to the second composite image can be created. In the second composite image, the part of the doll excluding the head not covered with the worn clothes is made to have a color of the color information stored in the RAM 33. The known composition process technique is employed at S135. Descriptions regarding the composition process executed at S135 are omitted. After the execution of S135, the CPU 31 ends the second composition process.

<Advantageous Effects of Embodiment>

According to the embodiment, the following advantageous effects can be obtained.

(1) The clothing design display system 1 includes the terminal 10, the image processing device 30, and the display device 40. The terminal 10 executes the acceptance process illustrated in FIGS. 2 to 4. The image processing device 30 executes the output process illustrated in FIGS. 11 to 13. In the acceptance process, the figure information, the clothing information, and the pattern information are obtained and transmitted to the image processing device 30 (see S11 to S27 in FIG. 2). In the output process, the first composition process illustrated in FIG. 18 and the second composition process illustrated in FIG. 19 are started (see S87 and S89 in FIG. 11), and the first composite data and the second composite data according to the figure information, the clothing information, and the pattern information from the terminal 10 are created (see S121 in FIG. 18 and S135 in FIG. 19). In the first composition process, the first composite data is transmitted to the terminal 10 (see S123 in FIG. 18). In the acceptance process, the first composite image corresponding to the first composite data is displayed in the display unit 15 (see S31, S37, S43, and S49 in FIG. 3 and FIGS. 8 to 10). In the output process, the second composite image corresponding to the second composite data is output to the display device 40 (see S93, S97, S101, and S105 in FIG. 12). As the display device 40, a large-sized display device that can display the displayed image in a large scale is employed.

Therefore, the display device 40 can display the second composite image (see FIGS. 15 to 17). Making the display device 40 large allows displaying the second composite image large. For example, the display device 40 may also display the second composite image in a state in which the set height of the doll in the doll data associated with the figure information corresponding to the figure of the wearer becomes the same extent to the second composite image. By displaying the second composite image in a large scale, the size of the clothes in the second composite age and of the actual clothes have close values, and failures caused by the difference in the perceived colors due to the area effect are solved beforehand.

By configuring the second composite image in the state in which the doll with the predetermined figure wears the clothes with the predetermined pattern and the predetermined shape, the wearer can recognize an impression of the newly-designed clothes. For example, suppose the newly-designed clothes are sleeveless or have short sleeves with the shape like the clothing information A1, A2, A3, and A5 illustrated in FIG. 6. Suppose that clothes that the wearer actually wears are long-sleeved clothes. Suppose that, the shot data corresponding to the shot image including the full length of the wearer is used to create the composite data. In this case, it is sometimes difficult in the composite image corresponding to the created composite data to accurately recognize the impression of the newly-designed clothes due to an influence from the long-sleeved part and a pattern of the part of the clothes that the wearer actually wears. When the impression of the newly-designed clothes is recognized, the influence from the clothes that the wearer actually wears can be restrained.

(2) The clothing design display system 1 includes the shooting device 50. The shooting device 50 shoots the wearer. In the output process, the shot data is obtained (see S71 in FIG. 11). In the second composition process, the head data is extracted from the shot data (see S131 in FIG. 19) and further the color information of skin in the head image is specified from the head data (see S133 in FIG. 19). In the second composition process, the head of the doll corresponding to the doll data is made the head image corresponding to the head data, and the second composite data corresponding to the doll with the part of the doll excluding the head not covered with the worn clothes is set as the color of the color information is created (see S135 in FIG. 19). In the first composition process, such combination is not executed. Therefore, the first composite image that does not include the head of the wearer displayed in the display unit 15 on the terminal 10 allows the wearer to recognize the impression of the clothes themselves. The second composite image displayed in the display device 40 allows the wearer to recognize the impression of the appearance when the wearer himself/herself wears the clothes.

(3) In the output process, after the intermediate data is created at S85 in FIG. 11, the first composition process is started at S87 in FIG. 11, and the second composition process is started at S89 in FIG. 11. Therefore, the respective front, back, and side clothing data and pattern data need not be combined at the respective first composition process and second composition process. In the first composition process, the respective front, back, and side intermediate data created at S85 are used. In the second composition process, the respective front, back, and side intermediate data created at S85 are used. The execution of the overlap process can be prevented and the efficiency of the processes can be improved.

<Modifications>

The embodiment can also be configured as follows. Some configurations of modifications illustrated below may also be employed in combination as appropriate. In the following description, points different from the above description are described, and the description of similar points is omitted as appropriate.

(1) The surfaces to be the process target are the front, the back, and the side. Then, the right side is the target as the side. The side as the process target may also be both right and left sides. In this case, the above-described process targeting the side and the like are properly executed to the targeted right side and left side. The storage device 32 stores the doll data and the clothing data corresponding to the respective right and left sides. The confirmation screens (see FIGS. 8 to 10) each include the left side button and the right side button.

Figure 2:
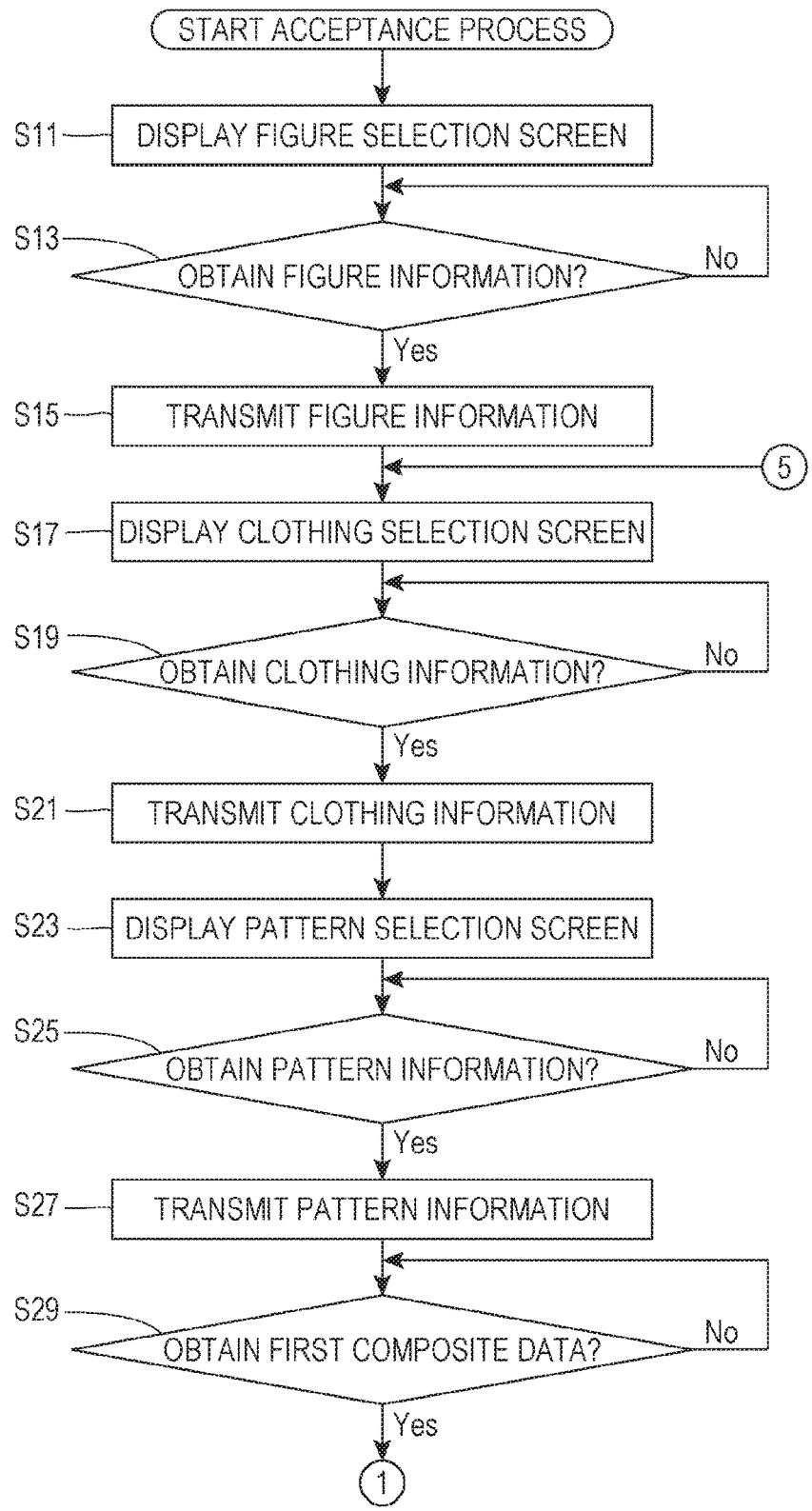
FIG. 2 is a flowchart for a first part of an acceptance process.
Figure 3:
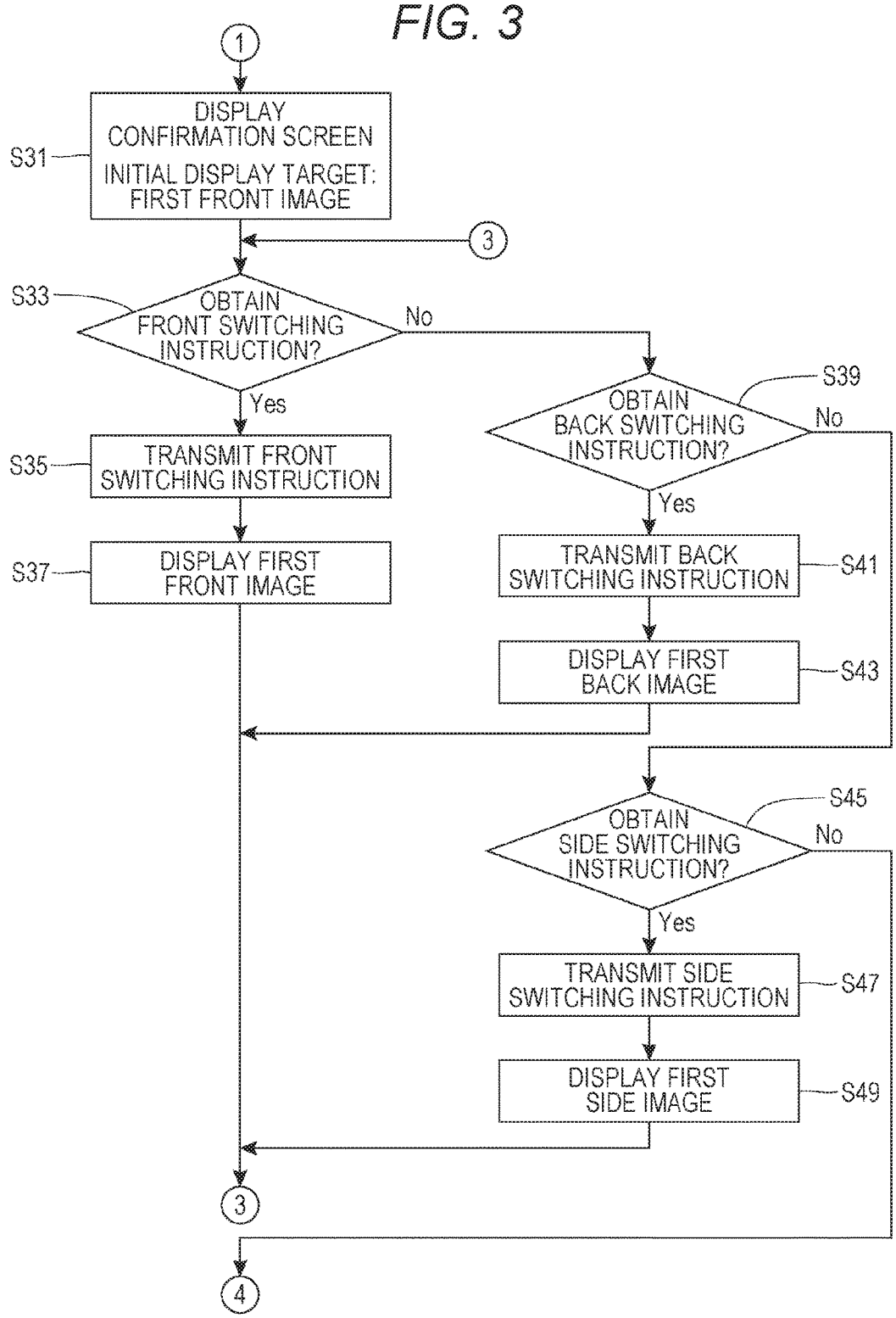
FIG. 3 is a flowchart for a second part of the acceptance process.
Figure 4:
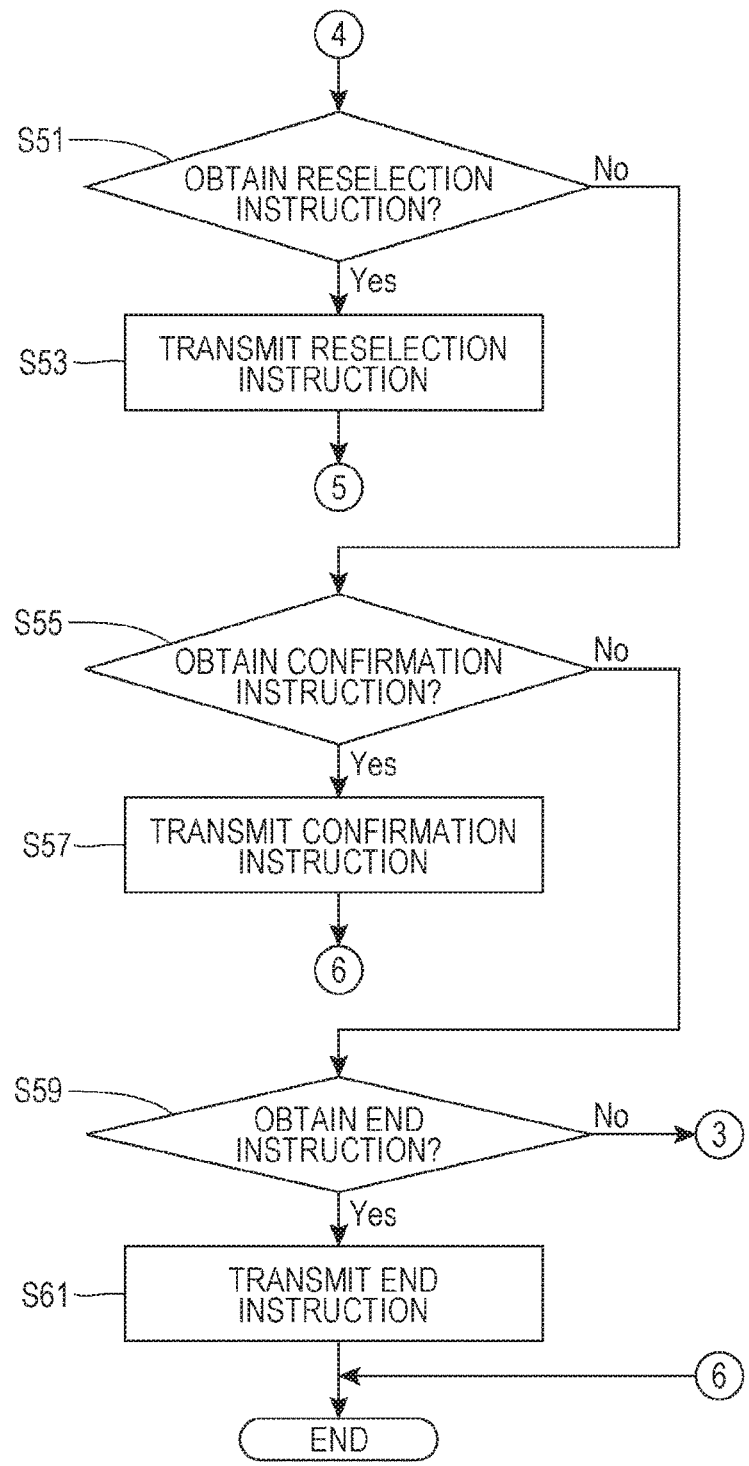
FIG. 4 is a flowchart for a third part of the acceptance process.

(2) The acceptance process illustrated in FIGS. 2 to 4 includes the process procedure that displays the figure selection screen (see FIG. 5) and obtains and transmits the figure information (see S11 to S15 in FIG. 2), the process procedure that displays the clothing selection screen (see FIG. 6) and obtains and transmits the clothing information (see S17 to S21 in FIG. 2), and the process procedure that displays the pattern selection screen (see FIG. 7) and obtains and transmits the pattern information (see S23 to S27 in FIG. 2). These respective three process procedures may also have an order different from the above-described order. For example, S11 to S15 in FIG. 2 may be executed, subsequently the process procedure corresponding to S23 to S27 in FIG. 2 may be executed, and afterwards the process procedure corresponding to S17 to S21 in FIG. 2 may be executed. Besides, the process procedure corresponding to S23 to S27 in FIG. 2 may be executed, subsequently, the process procedure corresponding to S17 to S21 in FIG. 2 may be executed, and afterwards the process procedure corresponding to S11 to S15 in FIG. 2 may be executed. Among the figure selection screen, the clothing selection screen, and the pattern selection screen, the return button 18 is omitted in the screen regarding the process procedure executed first. The screen regarding the process procedure executed second and the screen regarding the process procedure executed third include the return button 18. In the output process illustrated in FIGS. 11 to 13, the process procedure at S73 and S75, the process procedure at S77 and S79, and the process procedure at S81 and S83 are the orders corresponding to the orders of the respective three process procedures in the previously mentioned acceptance process.

(3) In the figure selection screen illustrated in FIG. 5, the doll images L, M, and S as the options are the reduced images corresponding to the doll data L, M, and S. In the clothing selection screen illustrated in FIG. 6, the clothing images A1, A2, A3, A4, and A5 as the options are the reduced images corresponding to the clothing data A1, A2, A3, A4, and A5. In the pattern selection screen illustrated in FIG. 7, the pattern images B1, B2, B3, B4, B5, and B6 as the options are the reduced images corresponding to the pattern data B1, B2, B3, B4, B5, and B6. In the respective screens, insofar as the correspondence relationship with the respective data is apparent, the respective images as the options may also be predetermined images different from the previously mentioned reduced images. In this case, the CPU 11 in the terminal 10 obtains the image data corresponding to the images as the options similar to the above-described case when the respective screens are displayed (see S11, S17, and S23 in FIG. 2).

(4) In the acceptance process illustrated in FIGS. 2 to 4, when the reselection instruction has been obtained (see S51: Yes in FIG. 4), the reselection instruction is transmitted (see S53 in FIG. 4). Afterwards, the process returns to S17 in FIG. 2. After the transmission of the reselection instruction at S53 in FIG. 4, the process may also be returned to S11 in FIG. 2. One or both of S15 and S21 in FIG. 2 may also be omitted. In this case, one or both of the figure information and the clothing information is transmitted together with the pattern information at the timing of S27 in FIG. 2.

(5) In the output process illustrated in FIGS. 11 to 13, the first composition process (see FIG. 18) and the second composition process (see FIG. 19) are sequentially started (see S87 and S89 in FIG. 11). Any one of the first composition process and the second composition process may also be omitted. For example, when the second composition process is omitted, whether the first composition process has been ended is determined at S91 in FIG. 12. At S93, S97, S101, and S105 in FIG. 12, the control is executed appropriately using the first composite data (the first front data, the first back data, and the first side data) created by the first composition process and stored in the RAM 33. The display device 40 displays the first composite image (see FIGS. 8 to 10) corresponding to the first composite data in the state similar to the second composite image illustrated in FIGS. 15 to 17.

Figure 19:
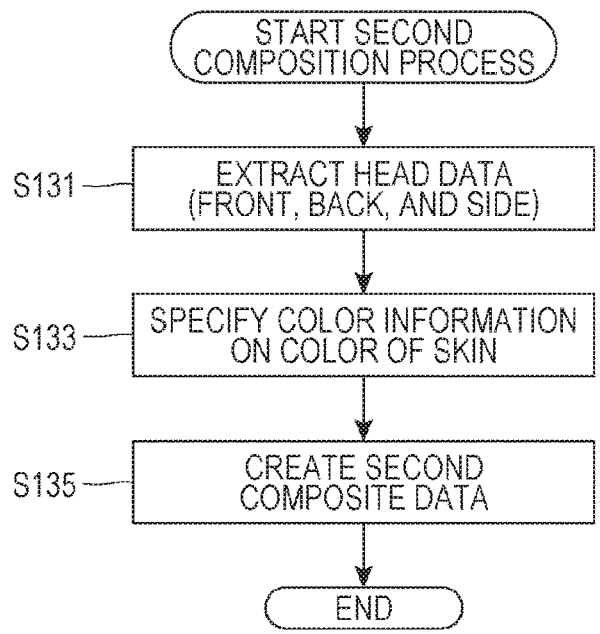
FIG. 19 is a flowchart for a second composition process.

When the first composition process is omitted, after S135 in FIG. 19 is executed, the communication unit 34 transmits the second composite data (the second front data, the second back data, and the second side data) to the terminal 10. At S91 in FIG. 12, whether the second composition process has been ended is determined. At S31, S37, S43, and S49 in FIG. 3, the control is executed appropriately using the second composite data. The display unit 15 displays the second composite image (see FIGS. 15 to 17) corresponding to the second composite data in the display area R in the state similar to the first composite image illustrated in FIGS. 8 to 10.

Besides, both the first composition process and the second composition process may also be omitted. In this case, the doll data may also be omitted. In the output process (see FIGS. 11 to 13), S87 and S89 in FIG. 11, and S91 in FIG. 12 are omitted. At S93, S97, S101, and S105 in FIG. 12, the control is executed properly using the respective front, back, and side intermediate data. The display device 40 displays the respective front, back, and side composite images (see FIG. 14) corresponding to the respective front, back, and side intermediate data in the state similar to the second composite image illustrated in FIGS. 15 to 17. After the execution of S85 in FIG. 11, in the output process, the communication unit 34 transmits the respective front, back, and side intermediate data to the terminal 10. At S31, S37, S43, and S49 in FIG. 3, the control is executed properly using the respective front, back, and side intermediate data. The display unit 15 displays the respective front, back, and side composite images FIG. 14) corresponding to the respective front, back, and side intermediate data in the display area R in the state similar to the first composite image illustrated in FIGS. 8 to 10. Similar to the above-described case, the figure information is stored as the confirmation information (S111 in FIG. 14) and used to produce the clothes.

(6) In the second composition process illustrated in FIG. 19, the head data is extracted from the shot data to specify the color information of skin from the head data (see S131 and S133 in FIG. 19). S131 in FIG. 19 may also be omitted. In this case, the head data is not combined at S135. At S135 in FIG. 19, the second composite data corresponding to the composite image of the doll with a head of a color of the specified color information is created. When the head data is not extracted, the color information of skin is specified targeting the data part regarding the area detected as the head by the image analysis on the shot data. S133 in FIG. 19 may also be omitted. In this case, the doll data stored in the storage device 32 may also be the image data corresponding to the doll with the predetermined skin color totally in advance.

(7) The clothing design display system 1 includes the terminal 10, the image processing device 30, and the display device 40 (see FIG. 1). The terminal 10 executes the acceptance process illustrated in FIGS. 2 to 4. The image processing device 30 executes the output process illustrated in FIGS. 11 to 13, the first composition process illustrated in FIG. 18, and the second composition process illustrated in FIG. 19. In the clothing design display system 1, the terminal 10 and the image processing device 30 are the clothing design output system 2 that makes the display device 40 display the composite image. The clothing design output system 2 may also be one information processing apparatus. When the clothing design output system 2 is the one information processing apparatus, as illustrated in FIG. 20, the clothing design output system 2 includes a CPU 91, a storage device 92, a RAM 93, an operating unit 94, a display unit 95, a communication unit 96, an output unit 97, and an input unit 98.

The CPU 91 corresponds to the CPUs 11 and 31. The CPU 91 is a controller for the clothing design output system 2 to control the clothing design output system 2 constituted of the one information processing apparatus. The CPU 91 executes the arithmetic processes and controls the clothing design output system 2. The storage device 92 corresponds to the storage devices 12 and 32. The storage device 92 stores the OS and various programs. The programs stored in the storage device 92 include the program for the acceptance process (see FIGS. 2 to 4), the program for the output process (see FIGS. 11 to 13), the program for the first composition process (see FIG. 18), and the program for the second composition process (see FIG. 19). The program for the second composition process includes an image analysis program to recognize and extract a head of a human. Further, the storage device 92 stores various data including the plurality of doll data, the plurality of clothing data, and the plurality of pattern data.

The RAM 93 corresponds to the RAMs 13 and 33. The RAM 93 serves as a storage area when the CPU 91 executes the OS and the various programs stored in the storage device 92. The RAM 93 stores predetermined information and data in a predetermined storage area in the middle of the execution of the process. The RAM 93 may also store the plurality of doll data, the plurality of clothing data, and the plurality of pattern data. In the clothing design output system 2, the CPU 91 as the control unit executes the OS and the various programs stored in the storage device 92. In association with this, the clothing design output system 2 executes various processes, and functions corresponding to the executed processes are achieved.

The operating unit 94 corresponds to the operating unit 14. The display unit 95 corresponds to the display unit 15. In the clothing design output system 2 illustrated in FIG. 20 as well, the operating unit 94 may also be constituted of the operating unit by the touchpad. In this case, the operating unit 94 and the display unit 95 constitute the touch panel. The communication unit 96 corresponds to the communication units 16 and 34. The communication unit 96 connects the clothing design output system 2 to the network 70. The communication unit 96 includes a network interface compatible with the wireless LAN communication method and a network interface compatible with the wired LAN communication method. Note that, the communication unit 96 may also be a communication unit including one kind of network interface of the previously mentioned two kinds of network interfaces. Connecting printing device 82 to the network 70 allows the clothing design output system 2 in the clothing production system 80 illustrated in FIG. 20 to instruct the printing device 82 to print the pattern corresponding to the pattern information in the confirmation information. Connecting cutting device 83 to the network 70 allows the clothing design output system the clothing production system 80 illustrated in FIG. 20 to instruct the cutting device 83 to cut the respective parts corresponding to the clothes in accordance with the figure information and the clothing information in the confirmation information. This is also applied to the clothing production system 80 illustrated in FIG. 1. That is, the image processing device 30 can instruct the printing device 82 to print the pattern corresponding to the pattern information in the confirmation information, making it possible to instruct the cutting device 83 to cut the respective parts corresponding to the clothes in accordance with the figure information and the clothing information in the confirmation information. Note that when the configuration to instruct the printing device 82 and the cutting device 83 to print the pattern and cut the respective parts, as previously mentioned, by the clothing design output system 2 is not employed in the clothing production system 80 illustrated in FIG. 20, the communication unit 96 may also be omitted.

The output unit 97 corresponds to the output unit 35. The input unit 98 corresponds to the input unit 36. In the clothing design output system 2 illustrated in FIG. 20, for example, the display device 40 is connected to the output unit 97. The shooting device 50 and the operating device 60 are connected to the input unit 98. In the clothing design output system 2 illustrated in FIG. 20, the CPU 91 executes the acceptance process and the output process similar to the above-described cases. In the above description, an inter-process communication with the predetermined information, instruction, and data transmitted and received between the terminal 10 and the image processing device 30 is executed between the process with the program for the acceptance process and the process with the program for the output process, which are executed by the clothing design output system 2 illustrated in FIG. 20.

In the clothing design output system 2 illustrated in FIG. 20, any one of the operating unit 94 or the operating device 60 may also be omitted. In this case, an operation corresponding to the operation executed to the operating unit 14 or the operating device 60 described above is executed to the configuration for the operation employed from the operating unit 94 or the operating device 60. When the operating unit 14 is omitted, the operation to the operating device 60 corresponding to the operation to the operating unit 14 is accepted by one or both of a keyboard and a computer mouse included in the operating device 60. For example, the selection of the doll image in the figure selection screen (see FIG. 5), the selection of the clothing image in the clothing selection screen (see FIG. 6), and the selection of the pattern image in the pattern selection screen (see FIG. 7) are executed by a click operation to the operating device 60 on the predetermined image as the option. To display the image displayed in the state of partially hidden or the non-displayed image on the previously mentioned respective screens, a scroll operation is executed on the operating device 60. Besides, the pressing of the return button 18 in the clothing selection screen and the pattern selection screen and the pressing of the front button 19, the back button 20, the side button 21, the reselect button 22, the confirm button 23, and the end button 24 included in the confirmation screen (see FIGS. 8 to 10) are executed by the click operation to the operating device 60 on the previously mentioned respective buttons.

DESCRIPTION OF REFERENCE SIGNS

1: Clothing design display system
2: Clothing design output system
10: Terminal
11: CPU
12: Storage device
13: RAM
14: Operating unit
15: Display unit
16: Communication unit
18: Return button
19: Front button
20: Back button
21: Side button
22: Reselect button
23: Confirm button
24: End button
30: Image processing device
31: CPU
32: Storage device
33: RAM
34: Communication unit
35: Output unit
36: Input unit
40: Display device
50: Shooting device
60: Operating device
70: Network
71: Access point
80: Clothing production system
81: Clothing production apparatus
82: Printing device
83: Cutting device
84: Sewing device
91: CPU
92: Storage device
93: RAM
94: Operating unit
95: Display unit
96: Communication unit
97: Output unit
98: Input unit
A1, A2, A3, A4, A5: Clothing data, clothing information, clothing image B1, B2, B3, B4, B5, B6: Pattern data, pattern information, pattern image
L, M, S: Doll data, doll image, figure information
R: Display area

The invention claimed is:

1. A clothing design display system comprising a terminal, an image processing device, and a display device, wherein:

the terminal includes a first controller and a first communication unit, the first controller being configured to obtain any of first clothing information and second clothing information as clothing information corresponding to a shape of clothes, the first clothing information corresponding to a first shape, the second clothing information corresponding to a second shape different from the first shape, the first controller being configured to obtain any of first pattern information and second pattern information as pattern information corresponding to a pattern of clothes, the first pattern information corresponding to a first pattern, the second pattern information corresponding to a second pattern different from the first pattern, the first communication unit being configured to transmit the clothing information and the pattern information obtained by the first controller to the image processing device;

the image processing device includes a second communication unit, a storage unit, a second controller, and an output unit, the second communication unit being configured to receive the clothing information and the pattern information transmitted from the terminal, the storage unit storing first clothing data and second clothing data, the first clothing data corresponding to clothes with the first shape associated with the first clothing information, the second clothing data corresponding to clothes with the second shape associated with the second clothing information, the storage unit storing first pattern data and second pattern data, the first pattern data corresponding to the first pattern associated with the first pattern information, the second pattern data corresponding to the second pattern associated with the second pattern information, the second controller being configured such that:

when the clothing information and the pattern information received by the second communication unit are the first clothing information and the first pattern information, the second controller combines the first clothing data and the first pattern data to create composite data corresponding to a composite image of clothes with the first pattern and the first shape;

when the clothing information and the pattern information received by the second communication unit are the first clothing information and the second pattern information, the second controller combines the first clothing data and the second pattern data to create composite data corresponding to a composite image of clothes with the second pattern and the first shape;

when the clothing information and the pattern information received by the second communication unit are the second clothing information and the first pattern information, the second controller combines the second clothing data and the first pattern data to create composite data corresponding to a composite image of clothes with the first pattern and the second shape; and when the clothing information and the pattern information received by the second communication unit are the second clothing information and the second pattern information, the second controller combines the second clothing data and the second pattern data to create composite data corresponding to a composite image of clothes with the second pattern and the second shape, the output unit being configured to output the composite image corresponding to the composite data created by the second controller to the display device;

the display device is configured to display the composite image output from the image processing device, the second communication unit is configured to transmit the composite data created by the second controller to the terminal, the first communication unit is configured to receive the composite data transmitted from the image processing device, the terminal includes a display unit configured to display the composite image corresponding to the composite data received by the first communication unit, the first controller is configured to obtain a reselection instruction that reselects the shape and the pattern of the clothes in a state that the composite image is displayed in the display device and the composite image is displayed in the display unit, the display unit is configured to end the display of the composite image being displayed in the display unit when the first controller obtains the reselection instruction and display a clothing selection screen or a pattern selection screen in the display unit, the clothing selection screen including a first clothing image associated with the first clothing information and a second clothing image associated with the second clothing information, the pattern selection screen including a first pattern image associated with the first pattern information and a second pattern image associated with the second pattern information, the first communication unit is configured to transmit the reselection instruction obtained by the first controller to the image processing device when the first controller obtains the reselection instruction, the second communication unit is configured to receive the reselection instruction transmitted from the terminal, and the display device is configured to continue displaying the composite image being displayed in the display device while the clothing selection screen or the pattern selection screen is displayed in the display unit, when the second communication unit receives the reselection instruction.

2. The clothing design display system according to claim 1, wherein the first controller is configured to obtain any of first figure information and second figure information as figure information corresponding to a figure of a human, the first figure information corresponding to a first figure, the second figure information corresponding to a second figure different from the first figure, the first communication unit is configured to transmit the clothing information, the pattern information, and the figure information obtained by the first controller to the image processing device, the second communication unit is configured to receive the clothing information, the pattern information, and the figure information transmitted from the terminal, the storage unit stores first doll data and second doll data, the first doll data corresponding to a doll with the first figure associated with the first figure information, the second doll data corresponding to a doll with the second figure associated with the second figure information, and the second controller is configured such that:

when the clothing information, the pattern information, and the figure information received by the second communication unit are the first clothing information, the first pattern information, and the first figure information, the second controller combines the first clothing data, the first pattern data, and the first doll data to create composite data corresponding to a composite image of a doll with the first figure who wears the clothes with the first pattern and the first shape;

when the clothing information, the pattern information, and the figure information received by the second communication unit are the first clothing information, the first pattern information, and the second figure information, the second controller combines the first clothing data, the first pattern data, and the second doll data to create composite data corresponding to a composite image of a doll with the second figure who wears the clothes with the first pattern and the first shape;

when the clothing information, the pattern information, and the figure information received by the second communication unit are the first clothing information, the second pattern information, and the first figure information, the second controller combines the first clothing data, the second pattern data, and the first doll data to create composite data corresponding to a composite image of a doll with the first figure who wears the clothes with the second pattern and the first shape;

when the clothing information, the pattern information, and the figure information received by the second communication unit are the first clothing information, the second pattern information, and the second figure information, the second controller combines the first clothing data, the second pattern data, and the second doll data to create composite data corresponding to a composite image of a doll with the second figure who wears the clothes with the second pattern and the first shape;

when the clothing information, the pattern information, and the figure information received by the second communication unit are the second clothing information, the first pattern information, and the first figure information, the second controller combines the second clothing data, the first pattern data, and the first doll data to create composite data corresponding to a composite image of a doll with the first figure who wears the clothes with the first pattern and the second shape;

when the clothing information, the pattern information, and the figure information received by the second communication unit are the second clothing information, the first pattern information, and the second figure information, the second controller combines the second clothing data, the first pattern data, and the second doll data to create composite data corresponding to a composite image of a doll with the second figure who wears the clothes with the first pattern and the second shape;

when the clothing information, the pattern information, and the figure information received by the second communication unit are the second clothing information, the second pattern information, and the first figure information, the second controller combines the second clothing data, the second pattern data, and the first doll data to create composite data corresponding to a composite image of a doll with the first figure who wears the clothes with the second pattern and the second shape; and when the clothing information, the pattern information, and the figure information received by the second communication unit are the second clothing information, the second pattern information, and the second figure information, the second controller combines the second clothing data, the second pattern data, and the second doll data to create composite data corresponding to a composite image of a doll with the second figure who wears the clothes with the second pattern and the second shape.

3. The clothing design display system according to claim 2, wherein the second controller is configured to obtain shot data corresponding to a shot image including a head of the human shot by a shooting device, the second controller is configured to extract head data corresponding to a head image of the head of the human from the shot data obtained by the second controller, and the second controller is configured such that:

when the clothing information, the pattern information, and the figure information received by the second communication unit are the first clothing information, the first pattern information, and the first figure information, the second controller combines the first clothing data, the first pattern data, the first doll data, and the head data that is extracted by the second controller to create composite data corresponding to a composite image of a doll with the first figure and further having a head set as the head image corresponding to the head data who wears the clothes with the first pattern and the first shape;

when the clothing information, the pattern information, and the figure information received by the second communication unit are the first clothing information, the first pattern information, and the second figure information, the second controller combines the first clothing data, the first pattern data, the second doll data, and the head data that is extracted by the second controller to create composite data corresponding to a composite image of a doll with the second figure and further having a head set as the head image corresponding to the head data who wears the clothes with the first pattern and the first shape;

when the clothing information, the pattern information, and the figure information received by the second communication unit are the first clothing information, the second pattern information, and the first figure information, the second controller combines the first clothing data, the second pattern data, the first doll data, and the head data that is extracted by the second controller to create composite data corresponding to a composite image of a doll with the first figure and further having a head set as the head image corresponding to the head data who wears the clothes with the second pattern and the first shape;

when the clothing information, the pattern information, and the figure information received by the second communication unit are the first clothing information, the second pattern information, and the second figure information, the second controller combines the first clothing data, the second pattern data, the second doll data, and the head data that is extracted by the second controller to create composite data corresponding to a composite image of a doll with the second figure and further having a head set as the head image corresponding to the head data who wears the clothes with the second pattern and the first shape;

when the clothing information, the pattern information, and the figure information received by the second communication unit are the second clothing information, the first pattern information, and the first figure information, the second controller combines the second clothing data, the first pattern data, the first doll data, and the head data that is extracted by the second controller to create composite data corresponding to a composite image of a doll with the first figure and further having a head set as the head image corresponding to the head data who wears the clothes with the first pattern and the second shape;

when the clothing information, the pattern information, and the figure information received by the second communication unit are the second clothing information, the first pattern information, and the second figure information, the second controller combines the second clothing data, the first pattern data, the second doll data, and the head data that is extracted by the second controller to create composite data corresponding to a composite image of a doll with the second figure and further having a head set as the head image corresponding to the head data who wears the clothes with the first pattern and the second shape;

when the clothing information, the pattern information, and the figure information received by the second communication unit are the second clothing information, the second pattern information, and the first figure information, the second controller combines the second clothing data, the second pattern data, the first doll data, and the head data that is extracted by the second controller to create composite data corresponding to a composite image of a doll with the first figure and further having a head set as the head image corresponding to the head data who wears the clothes with the second pattern and the second shape; and when the clothing information, the pattern information, and the figure information received by the second communication unit are the second clothing information, the second pattern information, and the second figure information, the second controller combines the second clothing data, the second pattern data, the second doll data, and the head data that is extracted by the second controller to create composite data corresponding to a composite image of a doll with the second figure and further having a head set as the head image corresponding to the head data who wears the clothes with the second pattern and the second shape.

4. The clothing design display system according to claim 3, wherein
the second controller is configured to specify color information of a skin of the human included in the head image from the head data extracted by the second controller, and
the second controller is configured to create the composite data corresponding to the composite image of a doll, the doll having a head set as the head image corresponding to the head data, a part of the doll excluding the head not covered with worn clothes being set as a color corresponding to the color information specified by the second controller.

5. The clothing design display system according to claim 4, wherein:
the second controller is configured to create first composite data and second composite data as the composite data corresponding to the composite image, the first composite data corresponding to a first composite image of a doll having a head not set as the head image corresponding to the head data, the second composite data corresponding to a second composite image of a doll having a head set as the head image corresponding to the head data,
the output unit is configured to output the second composite image corresponding to the second composite data created by the second controller to the display device,
the second communication unit is configured to transmit the first composite data created by the second controller to the terminal,
the first communication unit is configured to receive the first composite data transmitted from the image processing device, and
the display unit is configured to display the first composite image, the first composite image corresponding to the first composite data received by the first communication unit.

6. A clothing production system comprising:
the clothing design display system according to claim 4; and
a clothing production apparatus configured to produce clothes, wherein
the clothing production apparatus is configured to produce clothes in the composite image corresponding to the composite data created by the second controller.

7. The clothing design display system according to claim 3, wherein:
the second controller is configured to create first composite data and second composite data as the composite data corresponding to the composite image, the first composite data corresponding to a first composite image of a doll having a head not set as the head image corresponding to the head data, the second composite data corresponding to a second composite image of a doll having a head set as the head image corresponding to the head data,
the output unit is configured to output the second composite image corresponding to the second composite data created by the second controller to the display device, the second communication unit is configured to transmit the first composite data created by the second controller to the terminal, the first communication unit is configured to receive the first composite data transmitted from the image processing device, and the display unit is configured to display the first composite image, the first composite image corresponding to the first composite data received by the first communication unit.

8. A clothing production system comprising:
the clothing design display system according to claim 7; and
a clothing production apparatus configured to produce clothes, wherein
the clothing production apparatus is configured to produce clothes in the composite image corresponding to the composite data created by the second controller.

9. A clothing production system comprising:
the clothing design display system according to claim 3; and
a clothing production apparatus configured to produce clothes, wherein
the clothing production apparatus is configured to produce clothes in the composite image corresponding to the composite data created by the second controller.

10. A clothing production system comprising:
the clothing design display system according to claim 1; and
a clothing production apparatus configured to produce clothes, wherein
the clothing production apparatus is configured to produce clothes in the composite image corresponding to the composite data created by the second controller.

11. A clothing production system comprising:
the clothing design display system according to claim 2; and
a clothing production apparatus configured to produce clothes, wherein
the clothing production apparatus is configured to produce clothes in the composite image corresponding to the composite data created by the second controller.

12. A clothing design output system comprising:
a controller configured to obtain any of first clothing information and second clothing information as clothing information corresponding to a shape of clothes, the first clothing information corresponding to a first shape, the second clothing information corresponding to a second shape different from the first shape, wherein the controller obtains any of first pattern information and second pattern information as pattern information corresponding to a pattern of clothes, the first pattern information corresponding to a first pattern, the second pattern information corresponding to a second pattern different from the first pattern;

a storage unit configured to store first clothing data and second clothing data, the first clothing data corresponding to clothes with the first shape associated with the first clothing information, the second clothing data corresponding to clothes with the second shape associated with the second clothing information, wherein the storage unit stores first pattern data and second pattern data, the first pattern data corresponding to the first pattern associated with the first pattern information, the second pattern data corresponding to the second pattern associated with the second pattern information;

an output unit configured to output a composite image corresponding to composite data to a display device configured to display the composite image; and a display unit configured to display the composite image, the display unit being different from the display device, wherein the controller is configured such that:
when the clothing information and the pattern information obtained by the controller are the first clothing information and the first pattern information, the controller combines the first clothing data and the first pattern data to create composite data corresponding to a composite image of clothes with the first pattern and the first shape;

when the clothing information and the pattern information obtained by the controller are the first clothing information and the second pattern information, the controller combines the first clothing data and the second pattern data to create composite data corresponding to a composite image of clothes with the second pattern and the first shape;

when the clothing information and the pattern information obtained by the controller are the second clothing information and the first pattern information, the controller combines the second clothing data and the first pattern data to create composite data corresponding to a composite image of clothes with the first pattern and the second shape; and when the clothing information and the pattern information obtained by the controller are the second clothing information and the second pattern information, the controller combines the second clothing data and the second pattern data to create composite data corresponding to a composite image of clothes with the second pattern and the second shape, the output unit is configured to output the composite image corresponding to the composite data created by the controller to the display device, the display unit is configured to display the composite image corresponding to the composite data created by the controller, the controller is configured to obtain a reselection instruction that reselects the shape and the pattern of the clothes in a state that the composite image is displayed in the display device and the composite image is displayed in the display unit, the display unit is configured to end the display of the composite image being displayed in the display unit when the controller obtains the reselection instruction and display a clothing selection screen or a pattern selection screen in the display unit, the clothing selection screen including a first clothing image associated with the first clothing information and a second clothing image associated with the second clothing information, the pattern selection screen including a first pattern image associated with the first pattern information and a second pattern image associated with the second pattern information, and the display device is configured to continue displaying the composite image being displayed in the display device while the clothing selection screen or the pattern selection screen is displayed in the display unit, when the controller obtains the reselection instruction.

13. A clothing design output method comprising an obtaining step, a composition step, and an output step, the obtaining step being a step of obtaining any of first clothing information and second clothing information as clothing information corresponding to a shape of clothes, the first clothing information corresponding to a first shape, the second clothing information corresponding to a second shape different from the first shape, the obtaining step obtaining any of first pattern information and second pattern information as pattern information corresponding to a pattern of clothes, the first pattern information corresponding to a first pattern, the second pattern information corresponding to a second pattern different from the first pattern, the composition step being:

when the clothing information and the pattern information obtained by the obtaining step are the first clothing information and the first pattern information, a step of combining first clothing data and first pattern data to create composite data corresponding to a composite image of clothes with the first pattern and the first shape, the first clothing data corresponding to clothes with the first shape associated with the first clothing information, the first pattern data corresponding to the first pattern associated with the first pattern information;

when the clothing information and the pattern information obtained by the obtaining step are the first clothing information and the second pattern information, a step of combining the first clothing data and second pattern data to create composite data corresponding to a composite image of clothes with the second pattern and the first shape, the second pattern data corresponding to the second pattern associated with the second pattern information;

when the clothing information and the pattern information obtained by the obtaining step are the second clothing information and the first pattern information, a step of combining second clothing data and the first pattern data to create composite data corresponding to a composite image of clothes with the first pattern and the second shape, the second clothing data corresponding to clothes with the second shape associated with the second clothing information; and when the clothing information and the pattern information obtained by the obtaining step are the second clothing information and the second pattern information, a step of combining the second clothing data and the second pattern data to create composite data corresponding to a composite image of clothes with the second pattern and the second shape, and the output step being a step of outputting the composite image corresponding to the composite data created by the composition step to a display device, the display device being configured to display the composite image, wherein the method further comprises:

a display step of displaying the composite image in the display device and displaying the composite image in a display unit different from the display device; and a reselection step of obtaining a reselection instruction that reselects the shape and the pattern of the clothes in a state that the composite image is displayed in the display device and the composite image is displayed in the display unit, the display step comprising:

when the reselection instruction is obtained in the reselection step, ending the display of the composite image being displayed in the display unit and then displaying a clothing selection screen or a pattern selection screen in the display unit, the clothing selection screen including a first clothing image associated with the first clothing information and a second clothing image associated with the second clothing information, the pattern selection screen including a first pattern image associated with the first pattern information and a second pattern image associated with the second pattern information; and continuing displaying the composite image being displayed in the display device while the clothing selection screen or the pattern selection screen is displayed in the display unit when the reselection instruction is obtained in the reselection step.

\* \* \* \* \*